United States Patent [19]

Ejima

[11] Patent Number: 5,045,956
[45] Date of Patent: Sep. 3, 1991

[54] DATA REPRODUCING APPARATUS

[75] Inventor: Naoki Ejima, Hirakata, Japan

[73] Assignee: Matsushita Electric Industrial Co., Ltd., Osaka, Japan

[21] Appl. No.: 274,816

[22] Filed: Nov. 23, 1988

[30] Foreign Application Priority Data

Dec. 1, 1987 [JP] Japan .................................. 62-305047
Dec. 10, 1987 [JP] Japan .................................. 62-312702

[51] Int. Cl.$^5$ ................................................ G11B 5/09
[52] U.S. Cl. .................................................... 360/51
[58] Field of Search ..................................... 360/46, 51

[56] References Cited

U.S. PATENT DOCUMENTS 4,231,071 10/1980 Anderson .............................. 360/51
4,577,241 3/1986 Wilkinson ............................. 360/51

Primary Examiner—Vincent P. Canney
Attorney, Agent, or Firm—Wenderoth, Lind & Ponack

[57] ABSTRACT

In a data reproducing apparatus, the effective capture range is enlarged by controlling the capture range of the clock reproducing phase locked loop circuit based on the difference between a measured bit rate and a standard rate according to the operation mode. It is preferable to correct the bit rate additionally. Stable control may be performed even at the time of high speed searching accompanied by large mechanism load variations and under a transient state of mode transition, thus making it possible to read the data stably at all times.

14 Claims, 23 Drawing Sheets

- PARITY : $P = W1 \oplus W2 \,(\oplus \text{MOD2})$
- 1 BLOCK = 288 BITS (360 BITS AFTER 8-10 CONVERSION)

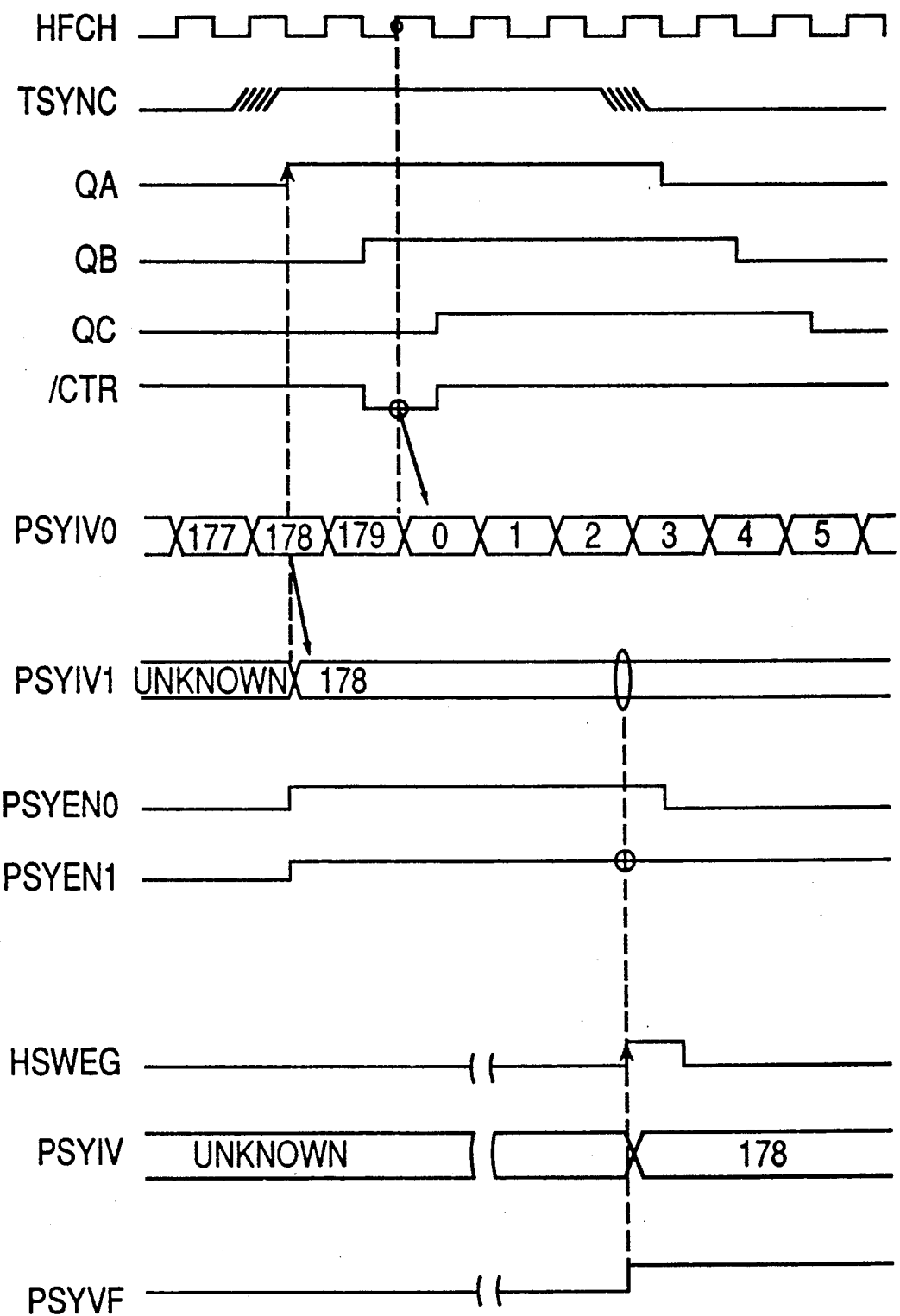
FIG. 16-a

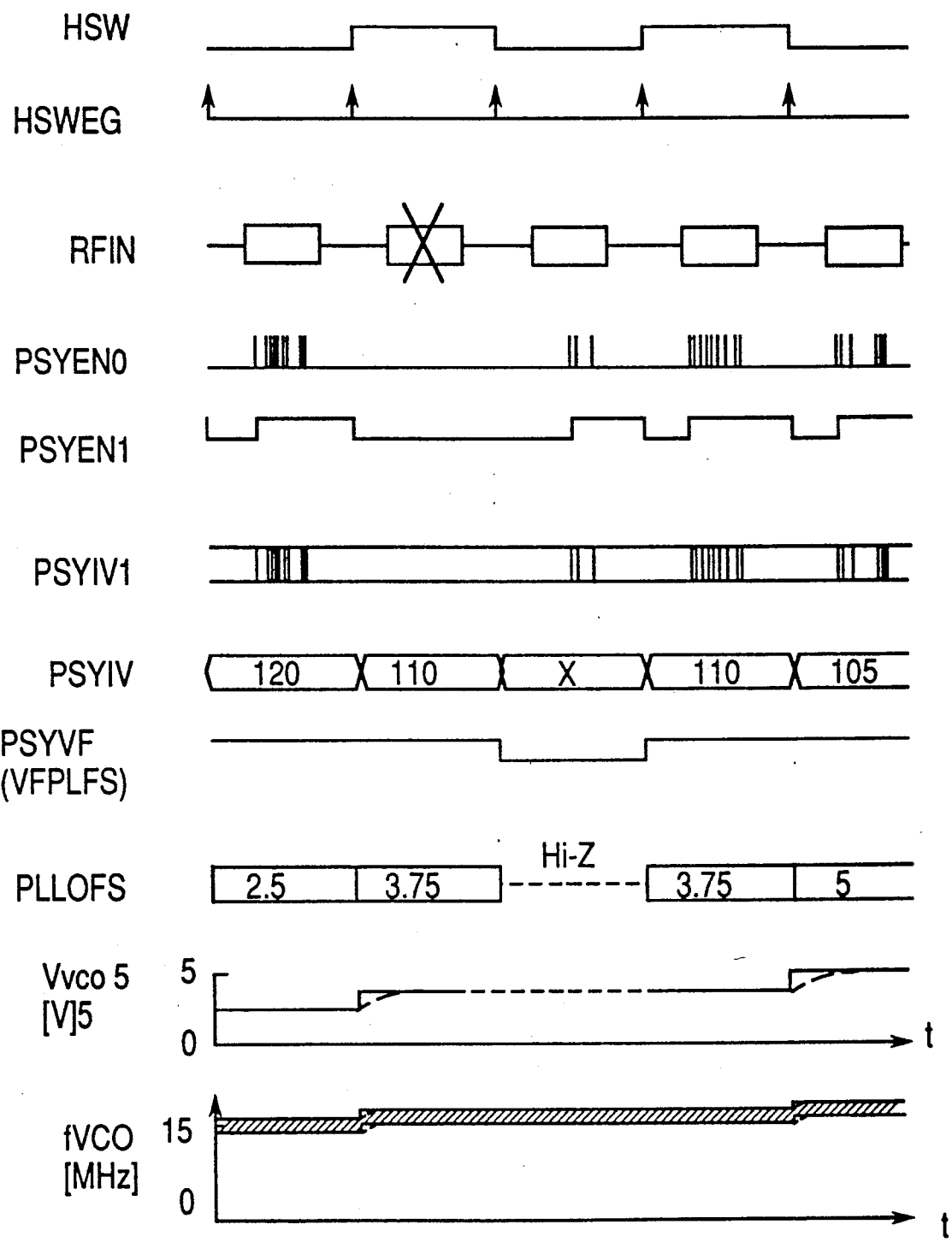
*FIG. 16-b*

| PLLMD | PSYIV-PLOTR | VFPLFS | PWM PATTERN | DUTY [%] |
|---|---|---|---|---|
| 1 SEARCH | -128 ~ -37 | 0 | 11111111 | 100 |
| | -36 ~ -15 | 1 | 11111111 | 100 |
| | -14 ~ -11 | 1 | 01111111 | 87.5 |
| | -10 ~ -7 | 1 | 01110111 | 75 |
| | -6 ~ -3 | 1 | 01011011 | 62.5 |
| | -2 ~ +1 | 1 | 01010101 | 50 |
| | +2 ~ +5 | 1 | 10100100 | 37.5 |
| | +6 ~ +9 | 1 | 10001000 | 25 |
| | +10 ~ +13 | 1 | 10000000 | 12.5 |
| | +14 ~ +35 | 1 | 00000000 | 0 |
| | +36 ~ +127 | 0 | 00000000 | 0 |
| 0 NORMAL | X | 1 | 01010101 | 50 |

*FIG. 17*

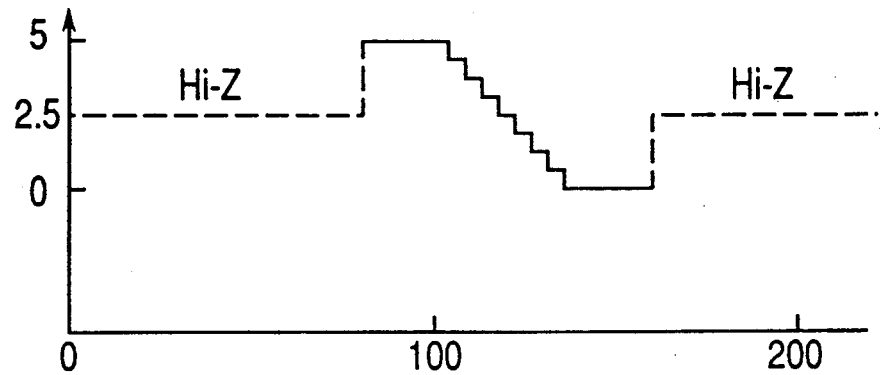
FIG. 18-a
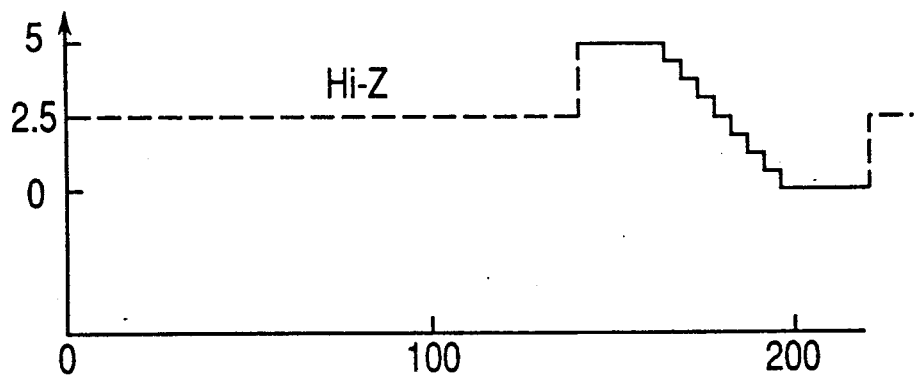
FIG. 18-b

DATA REPRODUCING APPARATUS

BACKGROUND OF THE INVENTION

1. Field of the Invention

The present invention relates to an apparatus for reproducing data employing a self-clock system such as an R-DAT (Rotary head system Digital Audio Tape recorder) and a digital video tape recorder, and more particularly to a data reproducing apparatus which is operated stably against bit rate variations at the time of searching and at a higher speed.

2. Description of the Prior Art

The digital recording technique has been applied to various fields such as sound and picture image recording in recent years, and techniques such as R-DAT and digital VTR techniques are being established. Among them, the technique of high speed searching for reading address information and control information while winding and moving a tape at a high speed has gained in importance along with a basic record reproducing technique.

Here, the outline of an R-DAT will be explained as a background technique. A track recorded obliquely on a tape with a rotary head of an R-DAT includes a plus azimuth track and a minus azimuth track. One track is composed of three data areas, a sub-data area 1, a main data area and sub-data area 2, and ATF areas 1 and 2 on which ATF signals used by tracking servos are recorded, etc. The sub-data areas 1 and 2 are areas where those data that are principally used for high speed searching such as time codes ae recorded, and are divided into 8 blocks, respectively, and block addresses are recorded at specific locations in the blocks. The main data area is an area where PCM audio data are recorded principally, and are divided into 128 blocks, and block addresses are recorded at specific locations in the blocks in the similar manner as the sub-data area. In respective data areas, block addresses are recorded at equal intervals.

The data that are base-band recorded on a tape medium are reproduced with two heads, one with a plus azimuth and one with a minus azimuth, opposedly disposed on a rotary cylinder. In general, the diameter of the cylinder is set at φ30 mm, the wrapping angle at 90 degrees, and the rotational speed at 2,000 rpm. The reproduced signal is amplified by a head amplifier and the waveform thereof is equalized with a equalizer so as to make it easy to extract data. In order to extract data, a clock corresponding to the bit rate of the reproduced signal is required. For this purpose, a clock reproducing phase locked loop circuit is employed. The reproduced data are supplied to a modulator-demodulator, applied with NRZI-NRZ conversion, 8-10 reverse conversion and deinterleaving here, and stored in a RAM once. Thereafter, error correction and error detection are executed by a code processor, and the reproduced data are supplied to a D/A converter through a PCM control portion and output as an analog signal output.

In regular reproducing, a recorded track is traced while keeping the tape travelling speed and the cylinder speed constant, thereby reproducing a clock of a constant bit rate so as to extract all of the data.

In searching, the tape is made to travel at a running speed several 100 times as high as that of regular reproducing. If the cylinder speed is also increased to several hundred times its normal speed, it is possible to trace the top of the recorded track, but the bit rate number is also increased to several hundred times its normal value due to the above noted state. Accordingly, the limit of achieving high speed in the circuit for reading and the limit within which the processor for processing may complete the operation within a predetermined period of time are far exceeded, and reproduction of the data can not be performed. It is not necessary to extract all of the data in searching, and it is only necessary to extract search control data. Thus, it is possible to partially read the data on the track recorded obliquely without changing the cylinder speed extremely from that of regular reproducing. In such a manner, it is arranged in an R-DAT so that the bit rate of a signal reproduced at the time of searching is almost the same as that of regular reproduction. That is, the track is traversed obliquely, but it becomes possible to keep the bit rate almost constant by controlling the relative velocity of the head to be almost constant.

Since the relative velocity of the head varies depending on the tape travelling speed and the cylinder speed, it is necessary to suppress such variation.

A technique for solving this problem has been disclosed in the prior art. As a conventional example, Japanese Laid-Open Patent Application No. 62-121951 may be considered. It is an object of this technique to increase reproducing reading capacity in high speed search. In order to achieve such an object, a mechanism control which makes the reproducing bit rate constant higher than a normal rate has been proposed. In this technique, a control signal is obtained by comparing the clock of the reproducing phase locked circuit obtained by F/V (frequency/voltage) conversion with a preset standard voltage. The bit rate is intended to be controlled to be almost constant by feeding back the control signal thus obtained to a servo at the cylinder speed. The problem of this technique exists in the forming method of the control signal, which results in a low reliability of the control signal. The R-DAT has two heads disposed opposedly on the cylinder, and winds the tape at a wrap angle of 90 degrees so as to thereby cause the tape to travel. Accordingly, even if the signals that are read from two heads are added together, still only intermittent data of a duty ratio of 1:1 are obtainable. Therefore, noises are mixed in sometimes during the time when data is lacking, viz., when the tape and the head are not contacted with each other opposedly, and the clock reproducing phase locked loop circuit causes unnecessary response because of noises in many occasions. It is not preferable to use the output of such a clock reproducing phase locked loop circuit as the control signal because of the low reliability thereof. There are stability problems such as a change with the passage of time and unevenness caused by analog processing when using an F/V conversion circuit.

Next, in order to allow bit rate variations to some extent and follow such variations, it is necessary for the capture range of the phase locked loop circuit to be wide.

As a conventional example, in Japanese Laid-open Patent Application No. 61-45451, a technique has been disclosed, in which when the locking of the phase locked loop circuit is released, detects such a release and has the range of the phase locked loop circuit displaced corresponding to the displaced quantity and follows such a displacement.

This technique presents a system for counting known data with a reproducing clock, which is able to generate control signals in accordance with the released quantity only when the locking of the phase locked loop circuit is released.

A first problem of this method exists in that data reproduction is interrupted until correction and redrawing are completed because displacement will not occur until the locking of the clock reproducing phase locked loop circuit is released. A second problem of this technique is that it is not possible at all to know the margin to the limit within the lock range because of the same reason as above, and therefore, it is not possible to prevent the release of locking from occurring. Moreover, a third problem of this technique is that detection reliability is insufficient, and confirmation thereof is impossible.

Furthermore, since data become intermittent at the time of searching, there is a problem related to the tape speed. In the R-DAT, data for searching such as program number data and address data are recorded on the same track as the principal data. As described above, the track is traversed obliquely at the time of searching. The speed of traversing the track (hereinafter referred to as the traverse speed) depends on the tape speed and is proportionate thereto in general. In the process of reproducing data at the time of traverse, on-track and off-track are repeated alternately. The readable data are those that exist during the time of on-track only. In other words, data reproduction is possible during the length of time in reverse proportion to the traverse speed. It is at least necessary that the data peculiar to the system required for search control appear in a group in the length of on-track time.

With the foregoing, in order to raise the limit of the tape speed at the time of searching, it becomes apparent in principle that it is more advantageous to increase the time density of the data.

SUMMARY OF THE INVENTION

It is an object of the present invention to provide a data reproducing apparatus which is able to read data stably and with a high accuracy in any mode or at the time of mode transfer.

In order to achieve abovementioned object, a data reproducing apparatus of the present invention is provided with bit rate measuring means for measuring a bit rate of a reproduced signal, a clock reproducing phase locked loop circuit extracting a clock from the reproduced signal, capture range control means for controlling the capture range of the phase locked loop circuit; and bit rate target value setting means for setting a bit rate target value, and is constructed so that the operating frequency of the clock reproducing phase locked loop circuit to respective bit rate target values correspond to the operation modes, and a control signal based on the difference between respective bit rate target values corresponding to operation modes and output data of bit rate measuring means is supplied to the capture range control means of the clock reproducing phase locked loop circuit so as to control the capture range of the lock reproducing phase locked loop circuit.

It is also preferable to provide bit rate correction means for correcting the bit rate. The correction means is constructed so that the bit rate is corrected by supplying the control signal based on the difference between respective bit rate target values corresponding to operation modes and by also supplying output data of the bit rate measuring means to the bit rate correction means.

With the construction described above, a plurality of bit rate target value setting portions for the time of searching and regular reproduction for raising the bit rate for operation and a standard value is provided to a control signal detecting portion or a capture range control portion from the bit rate target value setting portions, thus forming control signals based on the difference from the reproducing bit rate. Moreover, mode range switching data are supplied from the bit rate target value setting portions to the phase locked loop circuit, so as to thereby perform range setting of the large area. In parallel to the above, a control signal based on the difference from the reproduced bit rate is provided to the phase locked loop circuit from the capture range control portion so as to allow the capture range to deviate.

With these, the effective capture range of the clock reproducing phase locked loop circuit may be made wider than the capture range of a single body of the clock reproducing phase locked loop circuit with respect to the amount of deviation of the reproducing bit rate in respective modes. Also, a control signal based on the difference from the reproducing bit rate is provided to the mechanism control portion, so as to thereby make the variations of the reproducing bit rate itself small.

With this, in any mode or at any time of deviation, it is possible to suppress the bit rate variation of the reproduced data so as to be contained within the capture range of the clock reproducing phase locked loop circuit.

These two effects operate in correlation with each other. In other words, the feedback control loop forming method of a system including the mechanism and the method of enlarging the dynamic range of a control signal extracting portion which is an element forming the control signal, viz., a deviation amount measuring portion of the reproducing bit rate operate to compensate for each other. By means of such interaction, it becomes possible to measure the bit rate deviation amount while maintaining the locked state of the clock reproducing phase locked loop circuit, so as to thereby make the bit rate deviation minimal. Accordingly, such an excellent effect may be expected in a such a way that, even when the mechanism load variation is large or under a transient state of mode deviation, it is possible to stabilize the control system while reproducing data correctly.

According to the present invention, since a control signal is obtained, the period of a group of blocks of reproduced data is measured with a standard clock, thus making it possible to obtain an absolute value of deviation from the target value. Also, since reproduced data are employed at the beginning of the period, it is guaranteed that measured data obtained are unmistakably those that exist within the data existing period. Moreover, the reliability of measured data may be increased further by the fact that error detection is performed. It is also possible that only the measured data are adopted as control information when reliability is high, and that data obtained previously may be held and employed when reliability is low. When a state of low reliability continues for a long time, it is also possible to protect by using a preset default value.

In such a manner, by knowing a bit rate of a reproduced signal with high reliability and obtaining a correct control signal, highly accurate and stable control of data in high speed searching may be performed even in case of large mechanism load variations or under transient state of mode deviation. Thus, a data reproducing apparatus that always reads data stably may be realized.

BRIEF DESCRIPTION OF THE DRAWINGS

FIG. 16-a is a diagram showing the operating waveform of the synchronization signal interval detector 620 and the timing of data;

FIG. 16-b is a diagram showing typically a series of operations until bit rate measurement and capture range shift;

FIG. 17 is a conversion table of a PWM pattern converter;

FIG. 18-a is a diagram showing the relationship between PSYIV and PLLOFS when PLOTR=120;

FIG. 18-b is a diagram showing the relationship between PSYIV and PLLOFS when PLOTR=178;

DESCRIPTION OF THE PREFERRED EMBODIMENTS

A data reproducing apparatus of the present invention is be described below in connection with the embodiment thereof with reference to the accompanying drawings.

Figure 5:
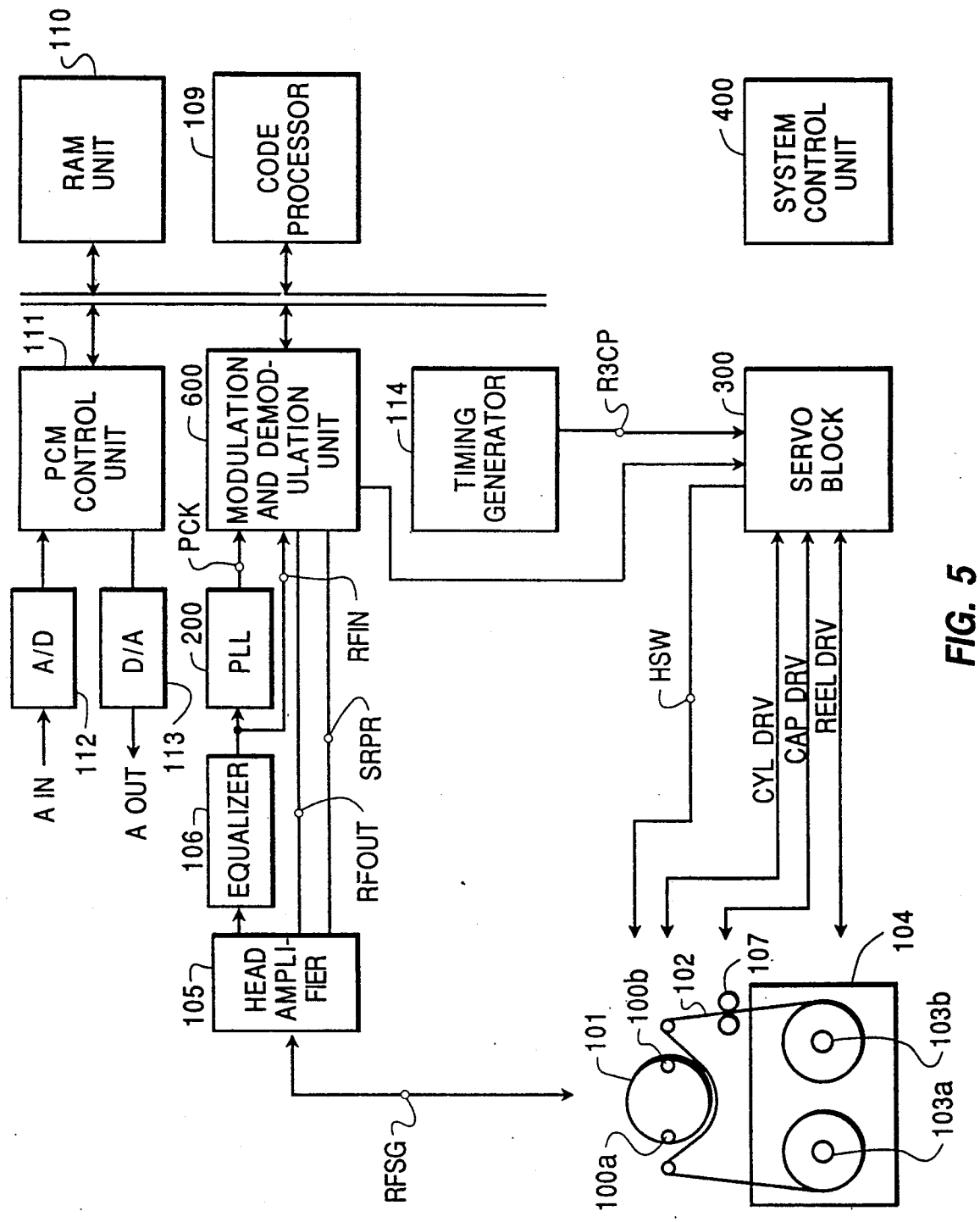
FIG. 5 is a system block diagram representing the whole R-DAT preferred to realize a data reproducing apparatus according to the present invention.
Figure 6B:
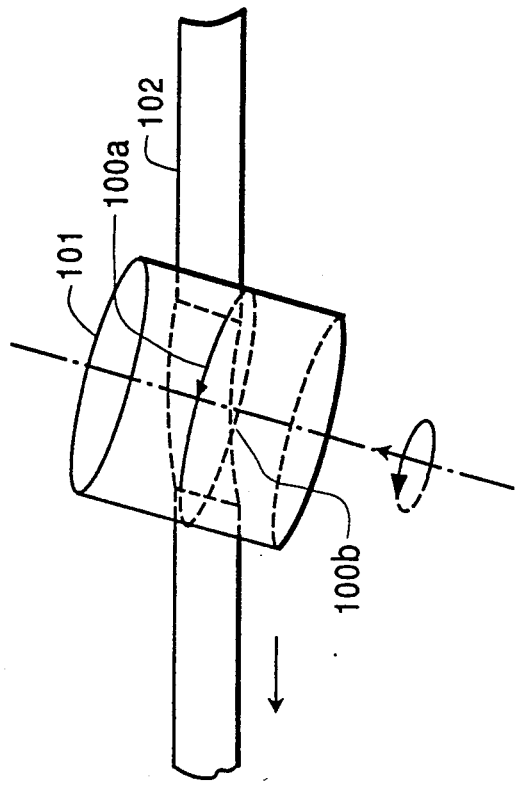
FIGS. 6A-6B are views showing the relationship between a tape and a head in an R-DAT.
Figure 6A:
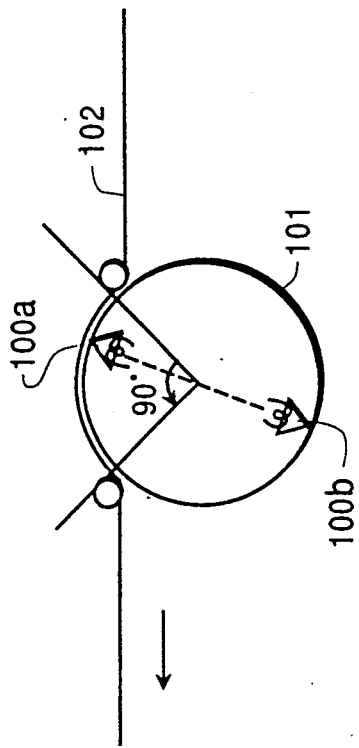

FIG. 5 is a system block diagram showing an R-DAT (Rotary head system Digital Audio Tape recorder) which is preferred for realizing a data reproducing apparatus according to the present invention. FIGS. 6A and 6B show the relationship between a tape and a head of the R-DAT. In FIG. 5 and FIGS. 6A-6B, reference numerals 100a and 100b denote recording/reproducing heads having azimuth angles at +20 degrees and -20 degrees, respectively element 101 is a cylinder; element 102 is a magnetic tape; elements 103a and 103b are reels for taking up the tape 102; element 107 is a capstan which has the tape travel at a constant speed at the time of reproduction; element 104 is a cassette for housing the magnetic tape; element 105 is a head amplifier for recording/reproduction; element 106 is an equalizer performing waveform equalization of a reproduced signal, element 200 is a phase locked loop (PLL) circuit for extracting a reproducing clock PCK. element 600 is a modulation and demodulation unit for performing demodulation of the reproduced signal and modulation of the record signal; element 109 is a code processor for performing error detection, error correction and creation of error correction code; element 110 is a RAM unit for storing modulation and demodulation data and PCM data, etc.; element 111 is a PCM processing unit for performing interpolation processing, etc. of reproduced PCM data; element 112 is an A/D converter; element 113 is a D/A converter; element 114 is a timing generator for generating a cylinder synchronization signal to be supplied to a servo block and various basic clocks to be supplied to other blocks, and element 300 is a servo block which controls the cylinder 101, the reels 103a and 103b and the capstan 107. Element 400 is a system control unit which controls the entire operation, such as a mode, of the system.

Figure 7:
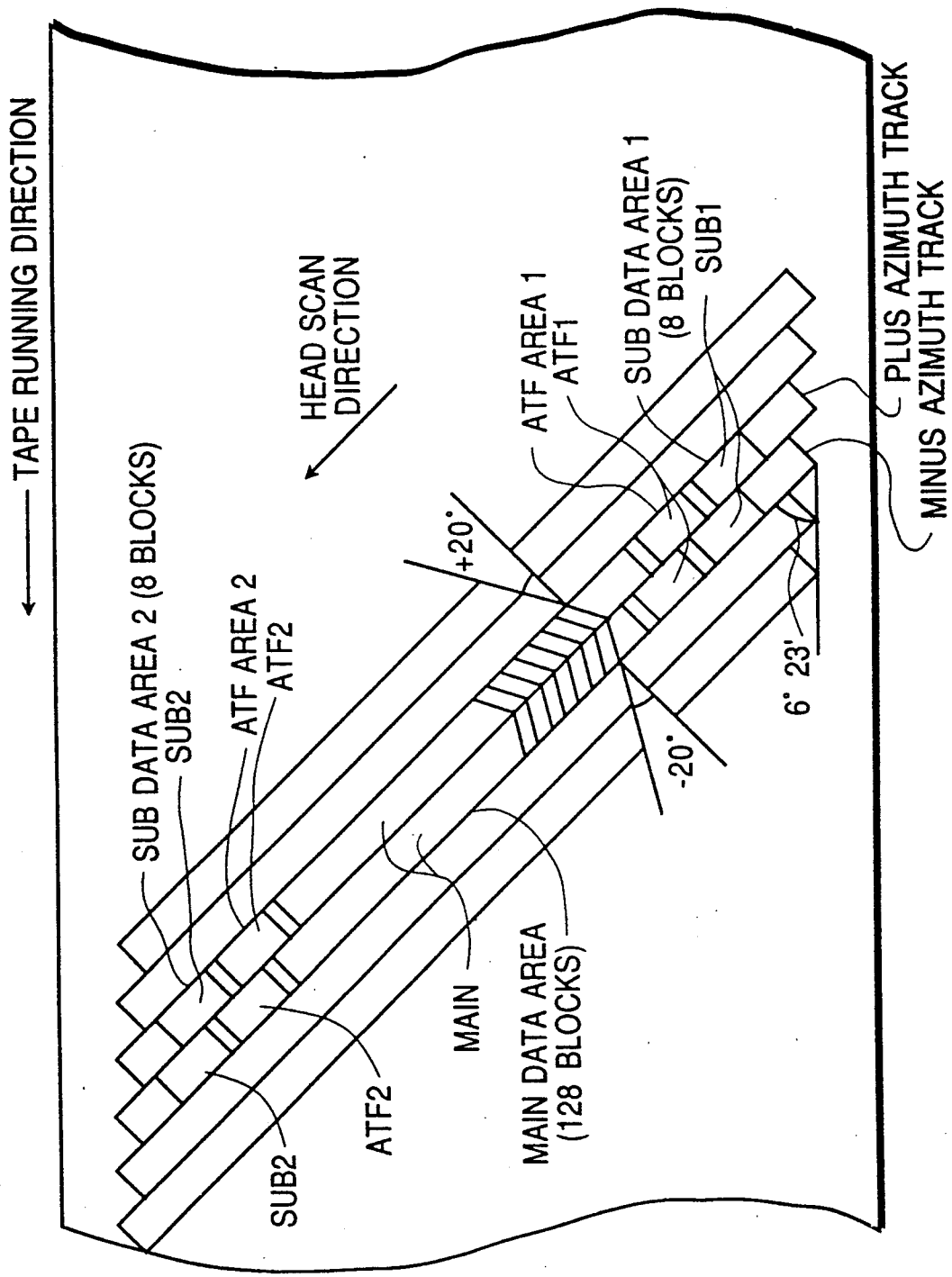
FIG. 7 is a diagram showing a format of a recorded data recorded on a tape.

The signal flow and processing at the time of recording is explained below. When the system control unit 400 indicates a recording mode, an audio input AIN is input to the A/D converter 112 and converted to 16 bit PCM data. The PCM data is input to a control unit 111, sent to the RAM unit 110 as 8 bit data and saved there. At this time, interleaving is applied. In the code processor 109, an error correction code is added to PCM data saved in the RAM unit 109 so as to thereby form data before modulation, which is saved in the RAM unit 110. Thereafter, the modulation-demodulation unit 600 performs modulation processing while reading modulation data at a predetermined timing from the RAM unit 110 and creates a record signal RFOUT. The second signal RFOUT is supplied to heads 100a and 100b through the head amplifier 105. On the other hand, the servo block 300 controls the rotation of the cylinder 101 with a synchronization signal R3CP generated by the timing generating unit 114 used as the reference so as to set a head touch section to the phase of the record signal RFOUT. Also, it generates a signal HSW for head switching. Switching is effected using this HSW signal so that the record current is applied to either the plus azimuth heads or minus azimuth. A signal is recorded on a tape in such a manner. A format of recorded data is shown in FIG. 7.

The signal flow and processing at the time of reproduction is explained below. When the system processor 400 indicates a reproducing mode, the servo block 300 controls the rotary phase of the cylinder 101 so that the head touch section and the demodulation timing are synchronized with each other with the R3CP signal used as the reference. The tape speed is also controlled so that the head traces the track using a tracking signal ATF (Automatic Track Finding) which is recorded with area divisions. A head signal RFSG reproduced from heads 100a and 100b is supplied to the equalizer 106 through the head amplifier 105 so as to thereby perform waveform equalization, and is supplied to the modulation and demodulation unit 600. At the same time, RFIN is supplied to the phase locked loop circuit, 200 so as to thereby extract a reproducing clock PCK and is supplied to the modulation and demodulation unit 600. The modulation and demodulation unit 600 writes demodulated data into the RAM unit 110. Furthermore, the code processor 109 reads demodulated data from the RAM unit 110 and performs error detection and error correction. The PCM control unit reads 8 bit data after correction out of the RAM unit 110 and supplies is to the D/A converter 113 as 16 bit data after applying interleaving. Also, the interpolation process is performed against data that has been judged non-correctable in the code processor 109. The D/A converter 113 outputs PCM data after converting it to an audio signal Aout.

Figure 8:
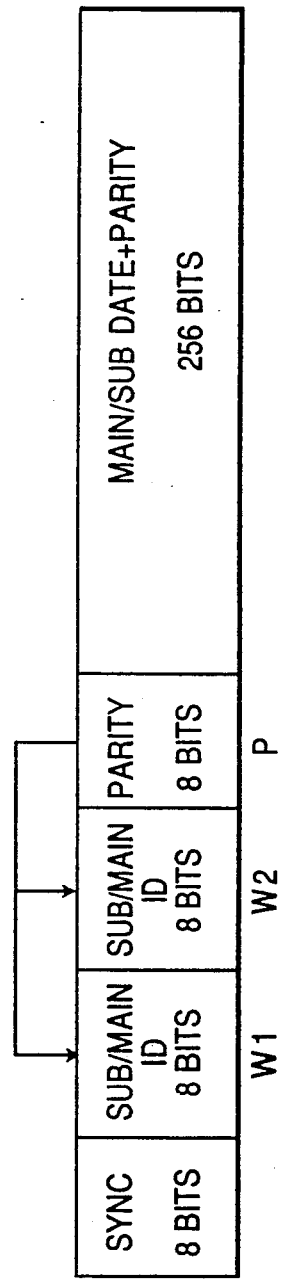
FIG. 8 is a diagram for giving a definition to a logical structure of one block.

Lastly, signal flow and processing at the time of searching especially related to the present invention is explained below. At the time of searching, the servo block 300 has the tape travel at a high speed several hundred times as high as that at the time of regular reproduction by the command from the system control unit 400. It is not required to extract all of the data at the time of searching, but it is only required to extract search control data in the sub data area. Corresponding to the search control data, the system control unit 400 controls the mechanism and migrates to reproducing operation, etc. As shown in FIG. 7, the sub data area is divided into a sub data area 1 and a sub data area 2 each consisting of 8 blocks. FIG. 8 shows a format which gives definition to the logical structure of one block. In this format, search control data is included in sub IDs of words W1 and W2 in even-numbered blocks. S-ID which is control data for starting a program is prescribed in the format so as to perform continuous recording for 9 seconds in normal record reproducing time. In order to surely read S-ID thus defined, it is necessary to meet two conditions described hereunder.

Figure 9A:
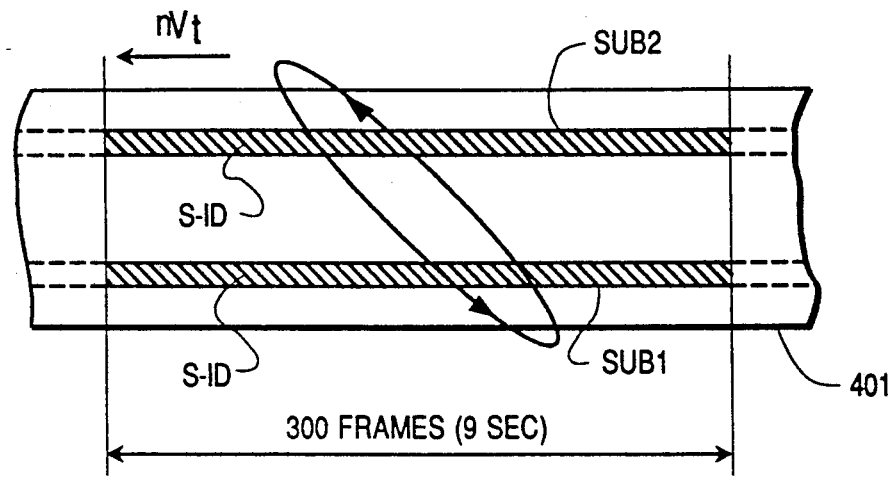
FIGS. 9A-9B show a recording portion S-ID on the tape and the timing that a head 100a or a head 100b traces the recording portion S-ID.
Figure 9B:
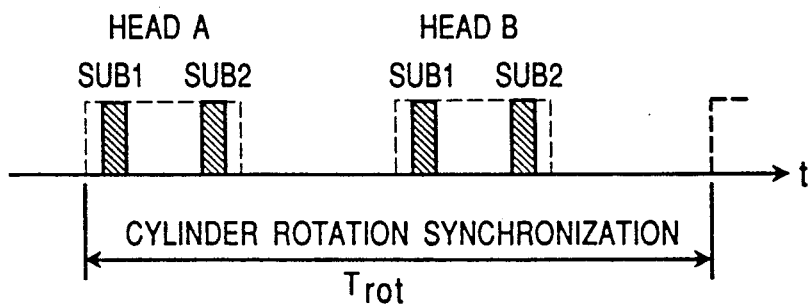

The first condition for reading S-ID surely is that, when the tape is within a continuous recording section for 9 seconds, the head 100a or 100b traces this section at least once. As shown in FIGS. 9A–9B, both the sub data area 1 (SUB 1) and the sub data area 2 (SUB 2) are traced with the half rotation of the cylinder. Therefore, the time when the recorded portion of S-ID passes through has to be longer than abovementioned time. When it is assumed that the rotation period of the cylinder is Trot, the tape speed at the time of normal record reproduction is Vt and the tape speed at the time of searching is n·Vt, the following relational expression is obtained.

$$Trot/2 \leq 9 \times Vt/(|n| \cdot Vt)$$

When it is readjusted, $$|n| \leq 18/Trot$$

When the cylinder speed is Cys(rpm), $$Trot = 60/Cys$$

By substituting the above, $$|n| \leq 0.3 \times Cys \qquad (1)$$

is obtained.

This is the first condition for reading S-ID surely.

Figure 10:
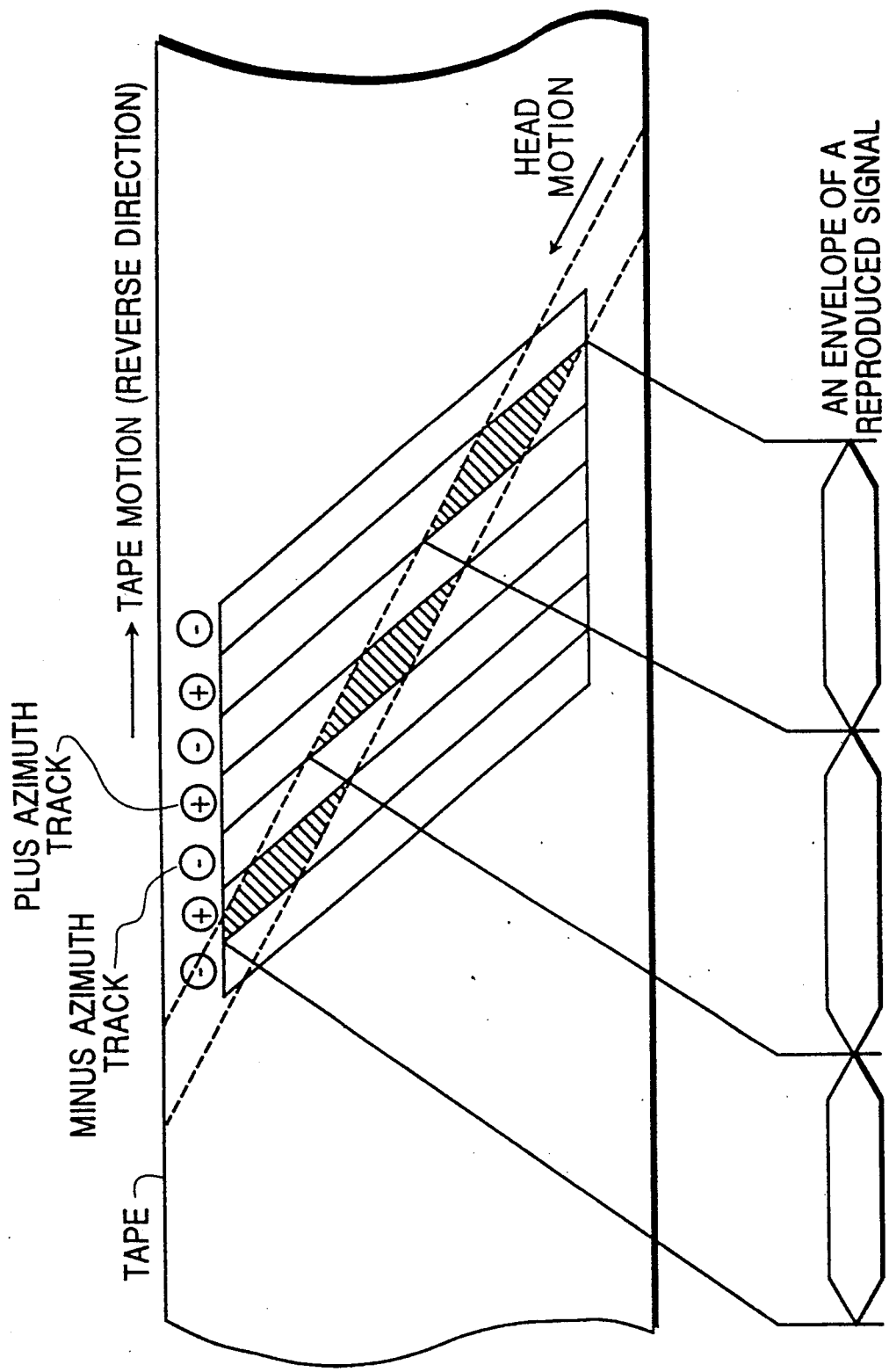
FIG. 10 is a diagram showing a head locus on the head at the time of searching and an envelope of a reproduced signal.

Furthermore, the second condition for reading S-ID surely is that it is necessary to read 2 blocks or more surely from among a group of block lengths of the reproducing data. The reason why 2 blocks are required is that S-ID is recorded in the even-numbered block only. FIG. 10 shows the head locus on a tape and an envelope of a reproduced signal at the time of searching. In the Figure, the reason why the amplitude of the envelope gets smaller is that the tape travels on a track of the azimuth reverse to the azimuth of the head. Also, the reason why the envelope takes a hexagonal shape is that the head width is wider as compared with the track. In such a way, the length reproducible as a group of blocks gets longer in proportion to the head speed, viz., the cylinder speed, and gets shorter as the tape speed at the time of searching gets faster. Now, when it is assumed that the bit rate of a reproduced signal is Brs, the length B1 of a group of blocks of reproduced data is expressed as follows:

$$\begin{aligned} B1 &= (Brs/360) \times \alpha \times (Vt \times 30/1000)/(|n \cdot Vt - Vt|) \\ &= Brs \times \alpha/(|n-1| \times 12000) \end{aligned}$$

Here, $\alpha$ shows a percentage of the portion where effective data are obtainable from among envelopes, and a value of $\alpha = 0.67$ was obtained in an experiment.

Furthermore, by substituting the condition $B1 \geq 2$ under which the length B1 of a group of reproduced data are 2 blocks or more is substituted and arranging the expression in a proper shape, $$|n-1| \leq 2.8 \times 10^{-5} \times Brs \qquad (2)$$

is obtained.

The expression (2) is the second condition for reading S-ID surely.

Figure 11:
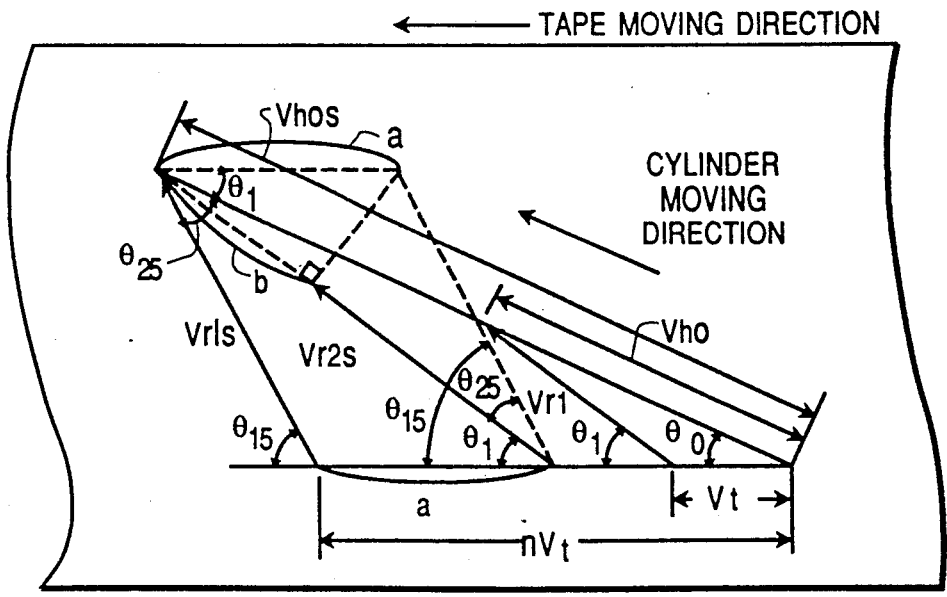
FIG. 11 is a diagram showing a relative moving speed of a tape and a cylinder.

Now, an expression showing the relationship between the bit rate Br of the reproduced signal, the tape speed and the cylinder speed is worked out. FIG. 11 shows a relative moving speed of the tape and the cylinder. In FIG. 11:

Vt is the tape speed at the time of normal record reproduction;

Vh0 is the cylinder speed at the time of normal record reproduction;

Vr1 is the composite vector at the time of normal record reproduction;

$\theta 0$ is the cylinder mounting inclination angle (still angle);

$\theta 1$ is an angle of a composite vector at the time of normal record reproduction;

nVt is the tape speed at the time of searching;

Vh0s is the cylinder speed at the time of searching;

Vr1s is the composite vector at the time of searching;

$\theta 1s$ is the angle of the composite vector at the time of searching;

Vr2s is the track angle component of the vector Vr1s; and $\theta 2s$ is the difference angle between the angle $\theta 1s$ and the track angle $\theta 1$.

The following expressions are obtained from FIG. 11:

a = nVt − Vt × Vh0s/Vh0
b = a × cos $\theta 1$
Vr2s = Vr1 × Vh0s/Vh0 − b

When those expressions are arranged in a proper shape, the following expression is obtained:

$$Vr2s = Vr1 \times Vh0s/Vh0 - \cos\theta 1 \times Vt \times (n - Vh0s/Vh0)$$

When it is assumed that the bit rate and the cylinder speed at the time of normal record reproduction are Br and Cy, and that the bit rate and the cylinder speed at the time of searching are Brs and Cys, Brs/Br = Vr2s/Vr1
Cys/Cy = Vh0s/Vh0

Thus, by substituting above expressions and arranging them in a proper shape, the following expression is obtained:

$$\begin{aligned} Brs/Br &= Cys/Cy - \cos\theta 1 \times Vt \times (n - Cys/Cy)/Vr1 \\ &= Cys/Cy \times (1 + \cos\theta 1 \times Vt/Vr1) - n \times \cos\theta 1 \times Vt/Vr1 \end{aligned}$$

Here, when general constants of the R-DAT:

Vt = 8.15 mm/s
Vh0 = 3.133 m/s
Vr1 = 3.125 m/s
$\theta 0$ = 6.3667 deg
$\theta 1$ = 6.3822 deg
Br = 9.408 Mbps
Cy = 2000 rpm are substituted, the following expression is obtained.

$$Brs/Br = Cys/Cy \times 1.00259 - n \times 0.00259 \quad (3)$$

Figure 12:
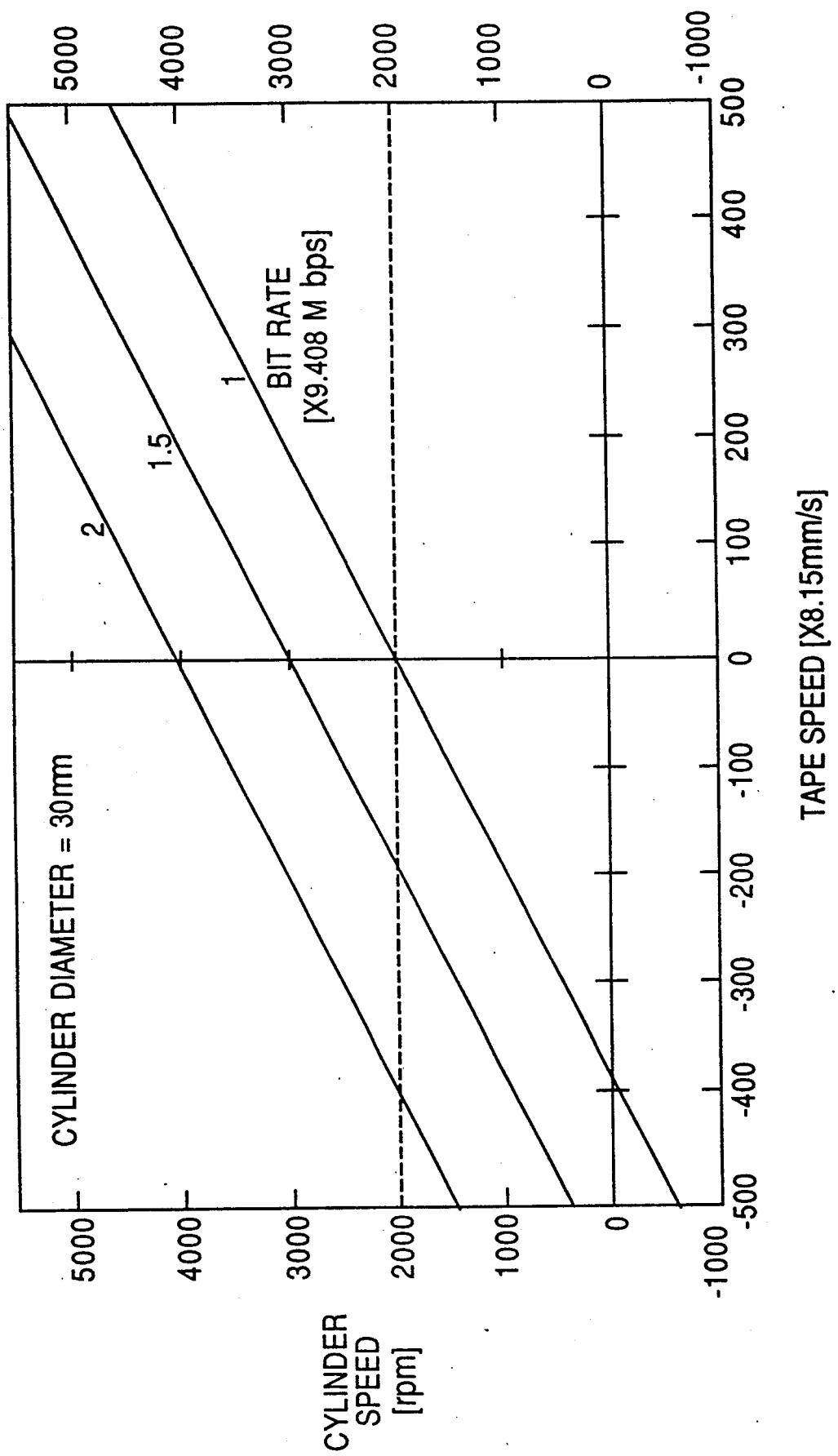
FIG. 12 is a diagram showing the relationship between the tape speed and the cylinder speed when the bit rate is made constant.

The expression (3) shows the relationship between the tape speed and the cylinder speed when the bit rate at the time of searching is made constant. FIG. 12 shows the relationship between the tape speed and the cylinder speed when the bit rate at the time of searching is made constant on the basis of the expression (3). In FIG. 12, the tape speed nVt is shown along the ordinate axis and the cylinder speed Cy is shown along the abscissa axis. Here, the plus direction of the tape speed nVt shows the FF (rapid traverse) mode and the minus direction of the tape speed nVt shows the REW (rewind) mode. With this Figure, such general property that it is only required to make the cylinder speed higher when the tape speed is plus, viz., at the time of rapid traverse searching, and to make the cylinder speed lower when the tape speed is minus, viz., at the time of rewind searching may be comprehended.

By means of two conditional expressions and the expression (3), the conditions for reading S-ID surely and the relationship between the bit rate, the tape speed and the cylinder speed have been all made clear. The foregoing may be put in order as follows:

$$|n| \leq 0.3 \times Cys \quad (1)$$

$$|n - 1| \leq 2.8 \times 10^{-5} \times Brs \quad (2)$$

$$Brs/Br = Cys/Cy \times 1.00259 - n \times 0.00259 \quad (3)$$

Figure 13:
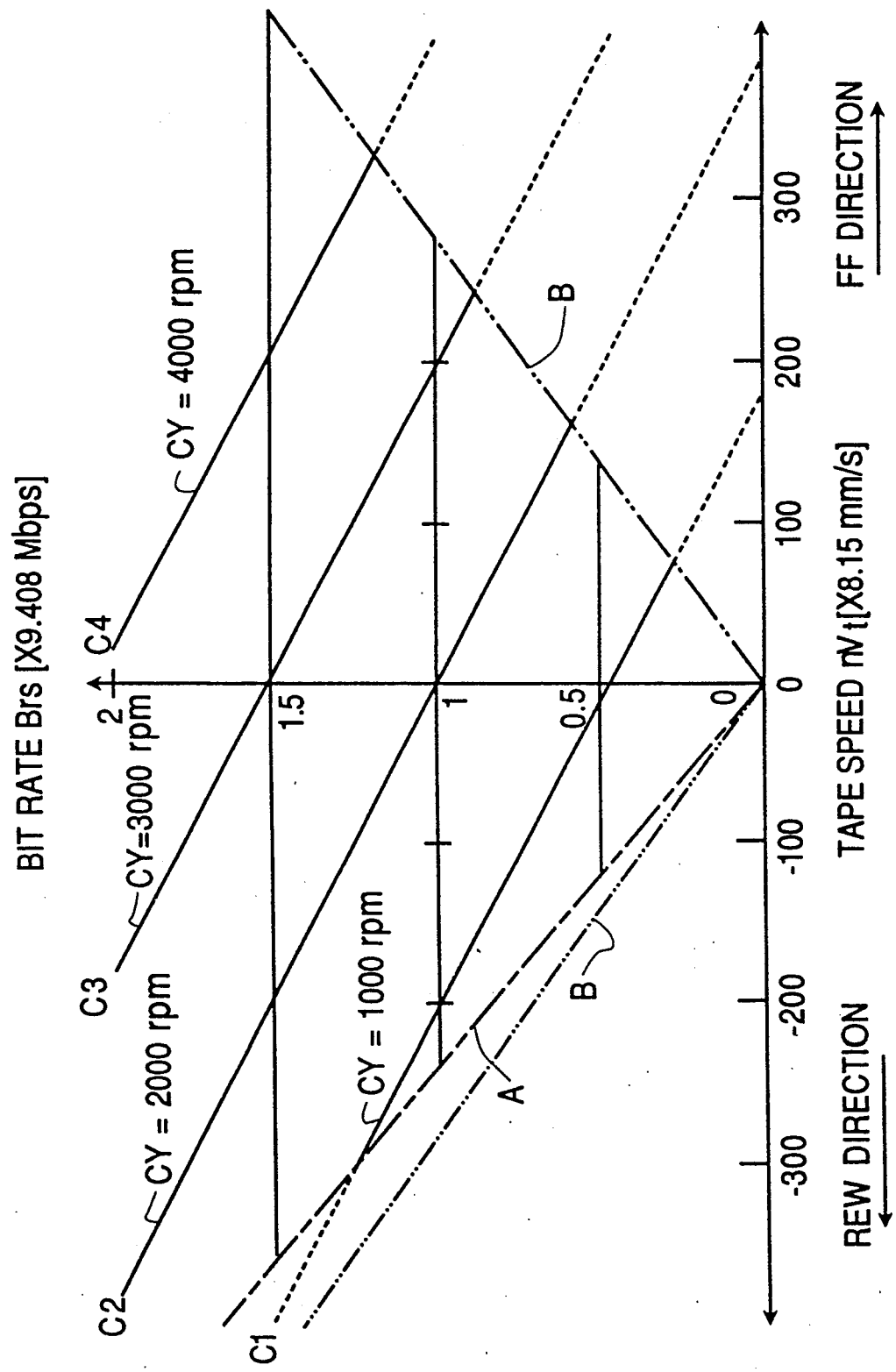
FIG. 13 is a diagram showing the relationship among conditions for reading S-ID surely, the bit rate, the tape speed and the cylinder speed.

FIG. 13 illustrates such a relationship synthetically. In FIG. 13, the tape speed nVt is shown along the ordinate axis and the bit rate Brs is shown along the abscissa axis. A one-dot chain line A in the Figure is a line showing the boundary of the area which satisfies the conditions by the expression (1), and a two-dot chain line B is a line showing the boundary of the area which satisfies the conditions by the expression (2). Also, lines C1, C2, C3 and C4 in the Figure shows characteristics when the cylinder speed Cy is made constant at 1,000 rpm, 2,000 rpm, 3,000 rpm and 4,000 rpm, respectively. Here, characteristics inside of the area that satisfies the conditions of expressions (1) and (2) are shown with solid lines and those in the area other than the above are shown with dotted lines. What is realized from this Figure is that it is required to increase the cylinder speed in particular so as to raise the bit rate at the time of rapid traverse searching and rather to decrease the cylinder speed so as to maintain the bit rate high at the time of rewind searching in order to read S-ID surely. What is important is that the limit value of the tape speed depends on the bit rate. For example, the range of the readable tape speed is expanded to −350 to +420 when the bit rate Br is increased to 1.5 times or 14.112 Mbps against that the bit rate Br is 9.408 Mbps same as the normal reproduction and the range of the readable tape speed is −240 to +280.

Accordingly, it may be seen that the marginal performance of reading rises as the bit rate is increased at the time of searching. In order to realize this, it is necessary to provide means for having the frequency characteristics of the equalizer 106 and the phase locked loop circuit 200 vary in accordance to the bit rate. However, it is difficult to realize a circuit which varies the waveform equalization characteristic and the capture range of the phase locked loop circuit 200 continuously, and such circuit will be costly even if available. Therefore, a method such that at least two or more bit rate target values are set and the frequency response of the equalizer 106 and the phase loop circuit 200 is changed over roughly in advance, so as to thereby be operated in these two scattered regions is practical, and this method is also adopted in the present embodiment.

To be more concrete, the first method is that a bit rate target value setting unit is provided in order to set the bit rate at the time of searching to a value which is higher than that at the time of normal record reproduction for controlling the mechanism so that the reproducing bit rate at the time of searching falls in the neighborhood of the target value. Such a control is performed by the fact that the servo block 300 controls the tape speed and the cylinder speed. Besides, this control system may be either an open loop or a local feedback loop, but it is most preferable to provide a feedback loop which detects the bit rate and obtains an error from the target value so as to thereby control the mechanism. With these, variations of the bit rate may be controlled to some extent in respective areas.

Also, it is indispensable to change over the frequency response of the equalizer 106 and the phase locked loop circuit 200 linking to the above, but it is preferable to provide a feedback loop in which at least the phase locked loop circuit 200 detects the bit rate and obtains the error from the target value so as to thereby control the capture range. With this, the effective capture range of the clock reproducing phase locked loop may be made wider than the capture range of a single phase locked loop circuit against the deviation of the reproduced bit rate in respective modes. In this manner, the bit rate variation of reproduced data is controlled and the capture range of the clock reproducing phase locked loop circuit is enlarged effectually so as to stabilize data reading in any mode and at the time of mode deviation.

Figure 1:
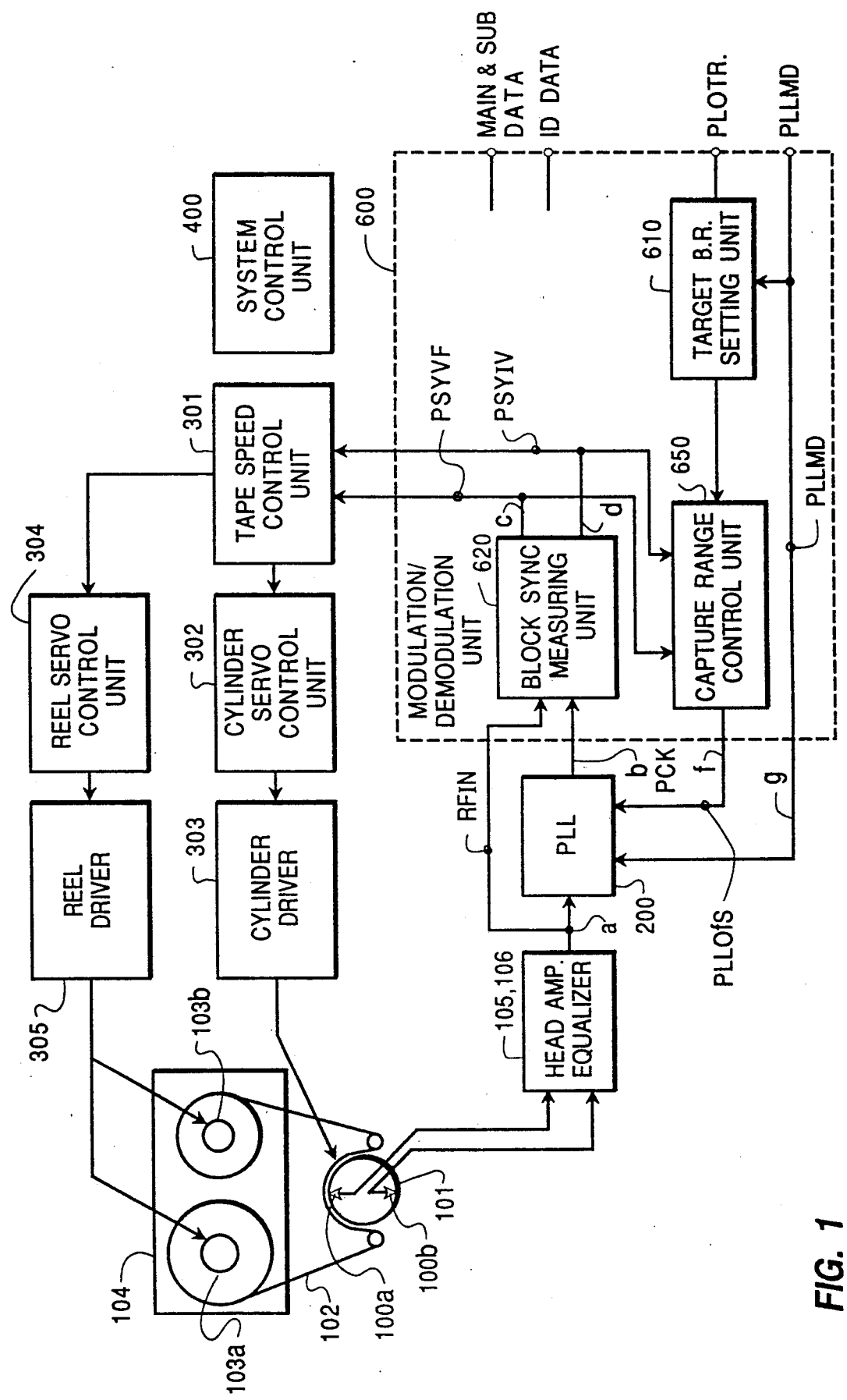
FIG. 1 is a block diagram showing a principal part of a first embodiment of a data reproducing apparatus according to the present invention.

Here, a first embodiment of the present invention will be explained with reference to FIG. 1. In FIG. 1, those elements which are the same as those of FIG. 5 have the same numerical designations. Special means are added to the modulation and demodulation unit 600. Reference numeral 620 denotes a bit rate detection unit; element is capture range control unit, and element 600 is a bit rate target value setting unit. The phase locked loop circuit 200 is provided with a special function, too. That is, an input terminal of an external control signal for shifting the capture range in a wide area and an input terminal of an external control signal for shifting the capture range in a narrow area are added, respectively. Also, the servo block 300 is shown more in detail than in FIG. 5, and reference numeral 301 denotes a tape speed control unit; element 302 is a cylinder servo control unit; element 303 is a cylinder driver; element 304 is a reel servo control unit and element 305 is a reel driver.

Figure 3:
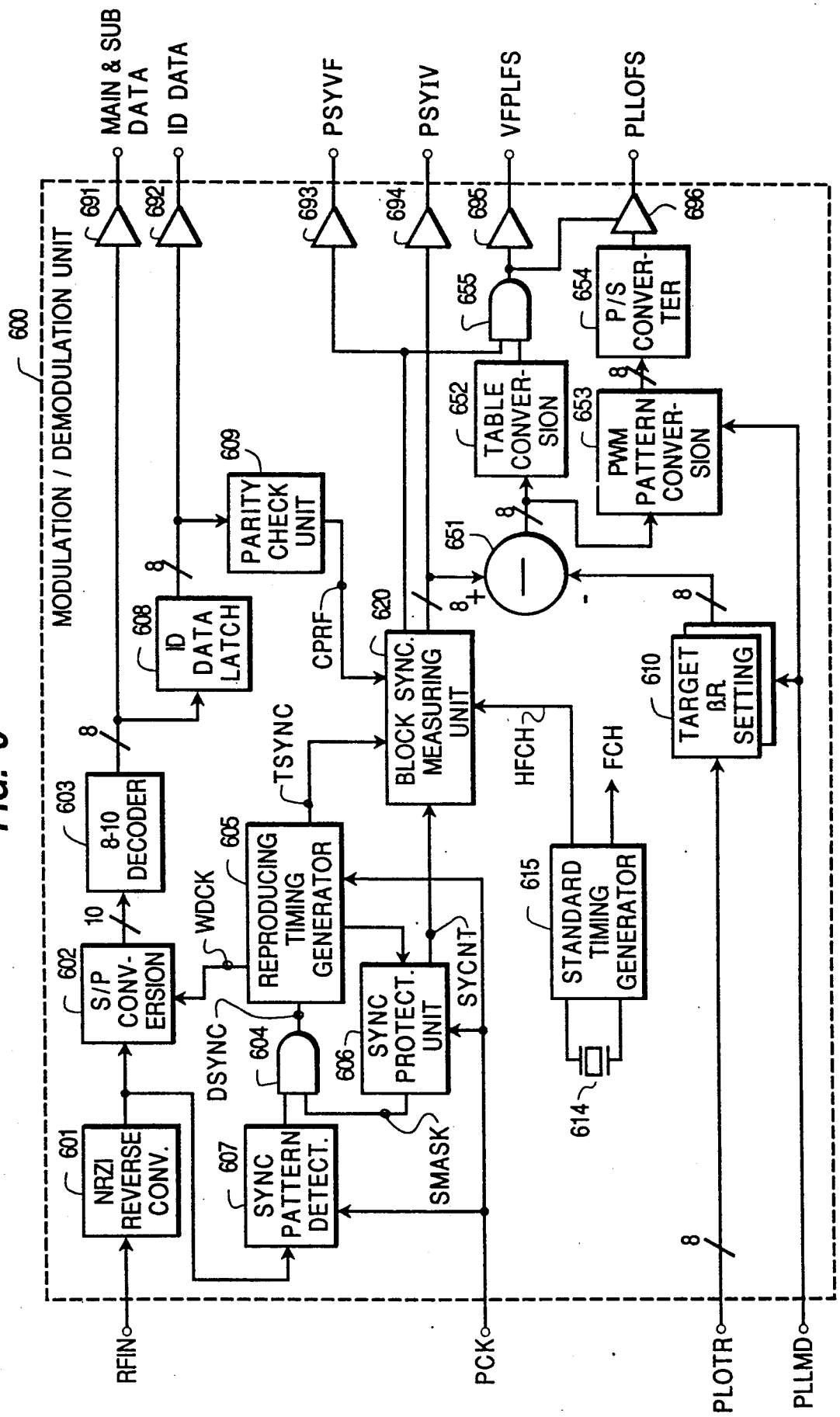
FIG. 3 is a block diagram showing the construction of the modulation-demodulation portion 600 shown in FIG. 1 and FIG. 2.

The detailed construction of the modulation and demodulation unit 600 is explained below. FIG. 3 is a block diagram showing the construction of the modulation and demodulation unit 600. In FIG. 3, element 601 is an NRZI reverse conversion unit for converting a reproduced signal RFIN which is NRZI modulated into an NRZ signal; element 607 is a SYNC pattern detection unit which extracts a block synchronizing signal SYNC from the NRZ signal and element 604 is a gate which sends out DSYNC which gives an initialization timing to a reproducing timing generator and also checks DSYNC when an erroneous SYNC caused by deformation of other signals is detected. Element 606 is a synchronization protection unit which performs gate control of DSYNC by judging the detection state of SYNC. The synchronization protection unit 606 outputs SYNC continuous flag SYCNT when two blocks of effective SYNC are detected in succession. Element 602 is a S/P conversion unit which performs serial-parallel conversion of the NRZ signal by word clock WDCK generated at the reproducing timing generator, and element 603 is an 8—10 decoder which converts 10 bit data which is S/P converted into 8 bit data and hoists an RF error flag RFF for data that does not suit an 8-10 modulation rule. Element 605 is a reproduction timing generator which initializes with the synchronization detection flag DSYNC sent out from synchronization protection unit 606 and gate 604 and generates demodulation processing timing with the reproduced clock PCK as the time reference. The reproduction timing generator also generates a signal TSYNC corresponding to the period in which the SYNC is detected, viz., the block period in addition the S/P conversion clock WDCK, a reproduced word address for writing demodulated data in the RAM unit 110 and a RAM write request signal WRRAM, and SYNC window SMASK used in synchronization protection unit 606 and gate 604. Element 608 denotes a data latch which latches 3 words following the block SYNC, W1, W2 and P. Element 609 is a parity check unit which performs a parity check of W1, W2 and P and raises a parity OK flag PRF only when the RF flag RFF supplied from the 8-10 decoder 603 is a 0 (no error) and the parity check is OK. The parity check unit 609 outputs a parity continuous flag CPRF which shows that the parity OK flag PRF is OK continuously. Element 614 is a quartz oscillator for creating a frequency which is the origin of the standard timing of the system, and element 615 is a standard timing generator which drives the quartz oscillator 614 to oscillate and also creates a clock FCH corresponding to the bit rate at the time of normal record reproduction and various timing including a clock HFCH having a double period thereof. Element 620 is a clock frequency measuring unit which counts TSYNC from the reproduction timing generator 605 with the standard clock HFCH of the standard timing generator 615, and outputs counting data PSYIV. Element 610 is a target bit rate setting unit which stores data PLOTR from a system control unit 400 and sets a target bit rate corresponding to mode data PLLMD. Element 651 is a subtracter which subtracts PLOTR from PSYIV. Element 653 is a PWM pattern converter which inputs output data of the subtracter 651 and converts it into a PWM pattern. Element 654 is a P/S converter which converts parallel data of the PWM pattern converter 653 into serial data and outputs this signal as PLLOFS through an output interface portion 696. Element 652 is a table converter which outputs a flag for judging the reliability of the measured data from the range of output data of the subtracter 651. Element 655 is an AND gate which outputs a flag VFPLFS showing the effectiveness of PLLOFS from the result of the table converter 652 and the conditions of PSYVF.

Figure 14:
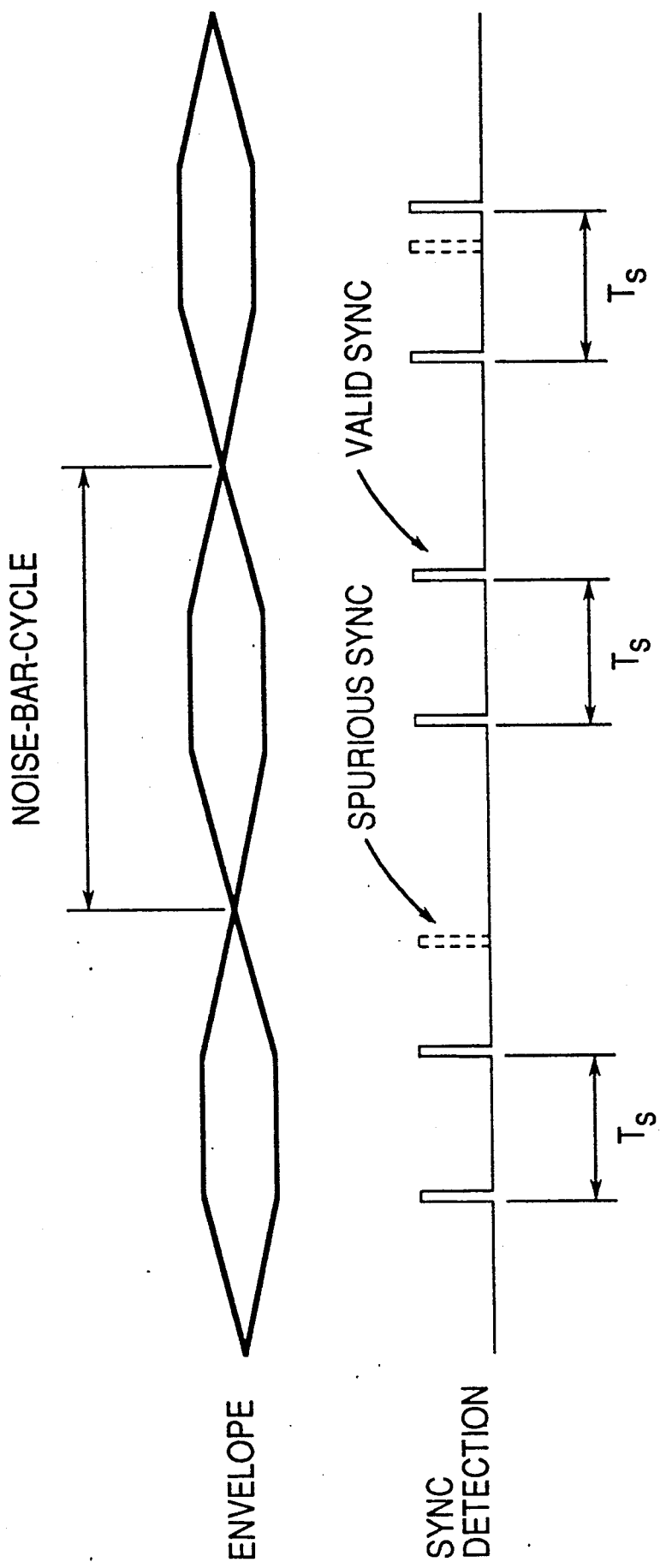
FIG. 14 is a timing diagram showing SYNC detection timing at the time of searching.

The operation at the time of searching in the data reproducing apparatus thus constructed is explained hereunder. At the time of searching, the envelope of a reproduced signal takes a hexagonal shape and noise bars are produced until the envelope becomes almost zero as shown in FIG. 10. FIG. 14 shows such a state. In FIG. 14, it is possible to detect SYNC in the range in which the amplitude of the envelope is sufficient, but particularly at the portion of noise bars, an error is liable to occur, and an apparent SYNC which is a SYNC pattern produced by deformation of the data other than effective SYNC. This is called spurious SYNC. Since the spurious SYNC is gated and excepted by SMASK created in the reproduction timing generator 605 and the synchronization protection unit 606, synchronization will not be disturbed. Only SYNC which is input with a correct frequency is taken out, thus establishing reproducing synchronization. At this time, the reproduction timing generator 605 outputs a signal TSYNC which corresponds to the period of SYNC and outputs at the same time a flag SYCNT showing that SYNC has been input correctly in succession. These are supplied to a block period measuring unit 620.

The block period measuring unit 620 counts the period of TSYNC using HFCH which is output from the standard timing generator 615. Since PSYIV which is data of the result of counting is a block period at the time of searching and is in reverse proportion to the bit rate, the bit rate at the time of searching is obtainable.

PSYIV is fed to the system control unit 400 through an output interface unit 694. Also, PSYIV is supplied to a positive side input terminal of the subtracter 651. PLOTR which is input from the system control unit 400 is stored once in a target bit rate setting unit 610, and PLOTR at the time of searching which is selected corresponding to PLLMD data is supplied to the negative side input terminal of the subtracter 651. The output of the subtracter 651 is data that corresponds to the difference between the actually measured PSYIV and the target value PLOTR. The output of the subtracter 651 is table-converted to be converted into PWM with the PWM pattern converter 653 and supplied to the P/S converter 654. In the P/S converter 54, parallel data is converted into serial data and output as PLLOFS through the output interface 696. Also, the output of the subtracter 651 judges the validity of the range with the table converter 652, and a flag is output to the AND gate 655. In the AND gate 655, PSYVF which is output from the block period measuring unit 620 is checked, and an output VFRLFS is output only when both outputs meet the conditions. At the same time, the output PLLOFS is made at a Hi-Z (high impedance) by controlling an output interface unit 696 with VFPLFS when the conditions are not met. Signals and data that are output auxiliarily from the modulation and demodulation unit 600 for the purpose of search control are PSYIV, PLLOFS, PSYVF and VFPLFS as described above.

PLLOFS which is output from the modulation and demodulation unit 600 and PLLMD which is output from the system control unit 400 are supplied to PLL 200. There are provided in PLL 200 an input terminal of an external control signal for shifting the capture range in a wide area and an input terminal of an external control signal for shifting the capture range in a narrow area.

Figure 4:
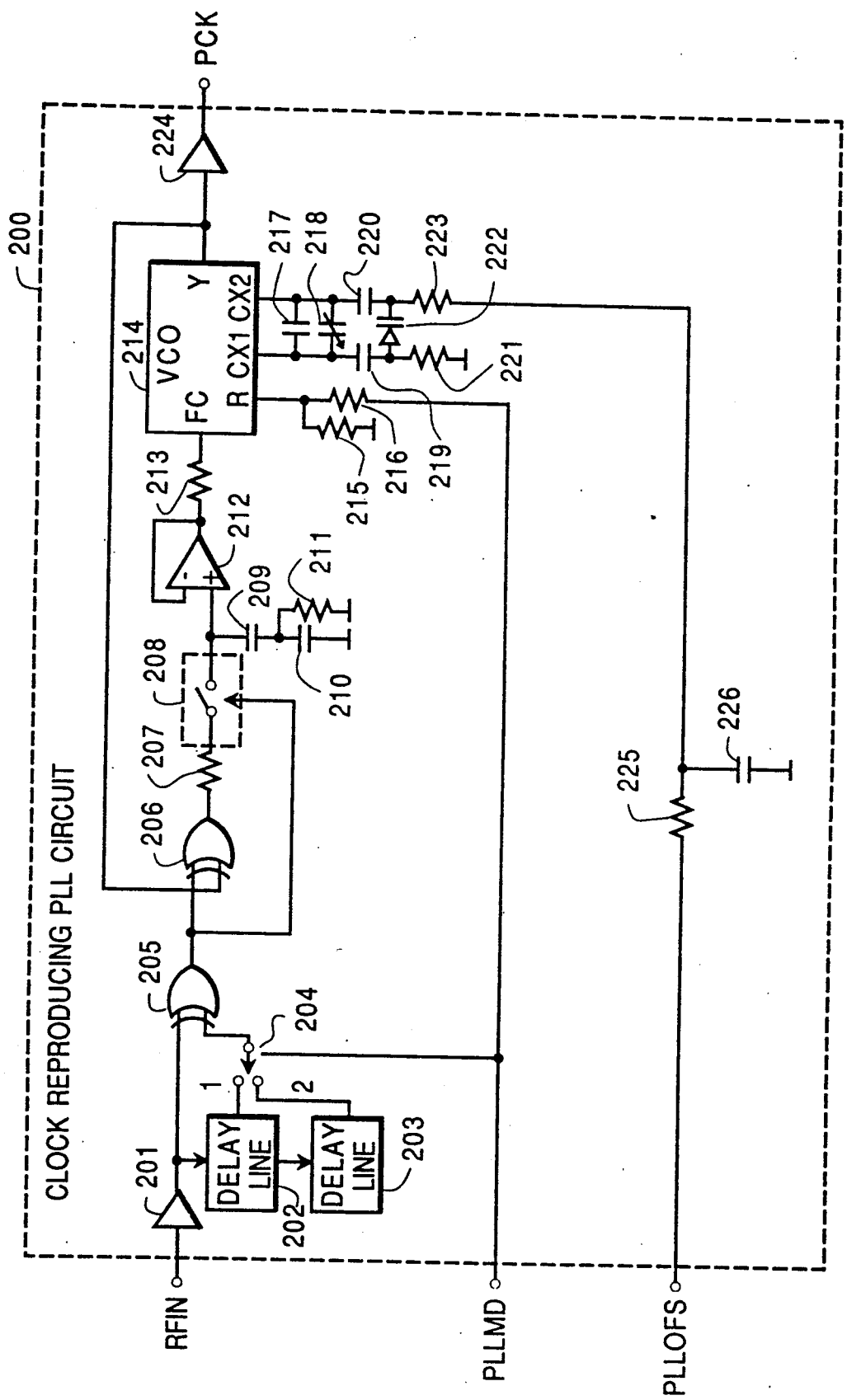
FIG. 4 is a circuit diagram showing the construction of a phase locked loop circuit 200 in the first and second embodiments according to the present invention.

A concrete embodiment of PLL 200 is shown in FIG. 4. In FIG. 4, element 201 is a buffer; elements 202 and 203 are delay lines; element 204 is a switch, elements 205 and 206 are EXOR (Exclusive OR) gates; elements 208 is an analog switch; element 212 is an operational amplifier; element 214 is a VCO (Voltage Controlled Oscillator); element 218 is a trimmer capacitor; element 222 is a varactor diode; element 224 is a buffer; elements 207, 211, 213, 215, 216, 221, 223 and 225 are resistors, and elements 209, 210, 217, 219, 220 and 226 are capacitors.

The operation of PLL 200 is explained hereunder.

The output signal RFIN of the equalizer 106 is input to the phase locked loop circuit 200 and output from the buffer 201. This signal is delayed by the delay line 202 and the delay line 203, and is supplied to the EXOR gate 205. RFIN is input directly to another input of the EXOR gate 205. A pulse in a certain time length with the rise edge and the down edge of RFIN is output from the EXOR gate 205. This time length is determined by the delay time of the delay line. Switching is made to the side 1 with the switch 204 at the time of searching, and switching is made to the side 2 at the time of normal production. When this pulse in a certain time length and the output signal PCK of the VCO 214 are supplied to the EXOR gate 206, the EXOR gate 206 outputs a pulse waveform in which the duty ratio varies in accordance with the phase difference between RFIN and PCK. The analog switch 208 is employed for the purpose of transmitting the edge portion only from among these pulses which is effective as a phase difference signal and the other portion is kept opened so as to hold electric charges stored in capacitors 209 and 210, so as to thereby improve the gain characteristic and to aim at stabilized operation. The phase detection output is supplied to the operational amplifier 212 through a low-pass filter consisting of resistors 207 and 211 and capacitors 209 and 210. The operational amplifier 212 operates as a voltage follower having a high input impedance so as to improve a holding characteristic of electric charges stored in capacitors 209 and 210. This signal is supplied to a frequency control terminal FC of the VCO 214. The output PCK of the VCO 214 is fed back to the phase detection unit EXOR gate 206 to form the PLL (Phase Locked Loop). The capture range in the PLL thus constructed is limited. The capture range is usually +10% to −10%. Therefore, it is arranged so that the operation area of the VCO 214 is changed by other means so as to thereby operate at different bit rates in accordance with the mode and to enable shift correction of the capture range. To be concrete, a voltage control multi-vibrator (TI Inc. Part Number SN74LS624) is used in the VCO 214. The voltage H or the voltage L corresponding to the logical level of PLLMD which is input from the control unit 400 is divided by resistors 215 and 216 and supplied to a range control terminal R of the VCO 214. With this, the operation area of the VCO 214 is changed greatly. Next, PLLOFS which is input from the modulation and demodulation unit 600 is smoothed by the resistor 225 and the capacitor 226, and is supplied as the bias voltage of the varactor, diode 222 through the resistors 223 and 221. In the varactor diode 222, the junction capacitance is varied in accordance with this bias voltage. The junction capacitance of the varactor diode 222 is coupled with terminals CX1 and CX2 of the VCO 214 with capacitors 219 and 220. The oscillation frequency may be controlled with the capacity of the capacitors coupled with the terminals CX1 and CX2. The capacitor 217 is employed for the purpose of damping the variation range, and the trimmer capacitor 218 is also employed for adjustment. Accordingly, it is possible to have the operation area change slightly, that is, to shift the capture range. By providing such control means of operation area, the output PCK of the VCO 214 is output through the buffer 224.

Figure 15:
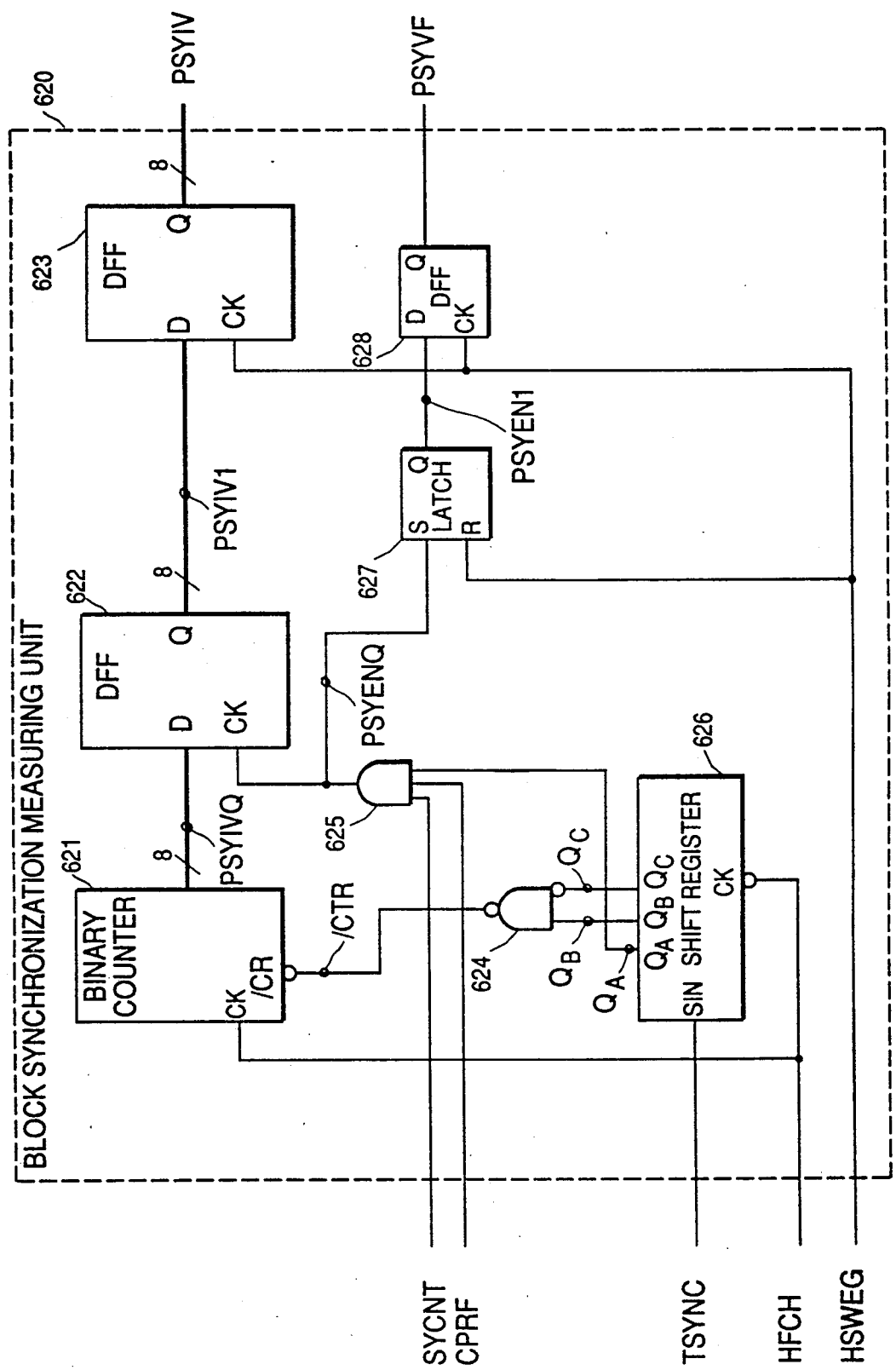
FIG. 15 is a concrete circuit diagram of a synchronization signal interval detector 620.

The block period measuring unit 620 is explained in detail below. FIG. 15 is a concrete circuit diagram of the block frequency measuring unit 620. In FIG. 15, element 621 is a binary counter; element 622 is a flip-flop circuit; element 623 is a D flip-flop circuit; element 624 is an AND gate, element 625 is an AND gate; element 626 is a shift register, element 627 is an S/R latch, and element 628 is a D flip-flop circuit. FIG. 16-a and FIG. 16-b show operating waveforms of the block frequency measuring unit 620 thus constructed.

In the first place, the control portion of the block period measuring unit 620 will be described. TSYNC is supplied to a serial input terminal of the shift register 626 from the reproduction timing generator 605, and HFCH is supplied to the clock terminal of the shift register 626 from the standard timing generator 615, respectively. By the shift register 626, TSYNC is clocked with HFCH and delayed outputs QA, QB and QC are output at every downward going edge of HFCH as shown in FIG. 16-a. The AND gate 624 produces a timing signal of /CTR from QB and QC and supplies it as a clear signal of the binary counter 621. The binary, counter 621 is clear reset with /CTR, and counts at every rising edge of HFCH and increments the output SYIV0. Since the output PSYEN0 of the AND gate 625 gives the AND of SYCNT of the synchronization protection unit 606, CPRF from the parity check unit 609 and QA of the shift register 626, SYNC is detected continuously and QA is transmitted to the clock terminal of the D flip-flop circuit 622 only when the parity is OK continuously. Since the rising edge of PSYIV0, viz., the rise timing of QA precedes ahead of /CTR by one clock of HFCH, it is possible to store the counted value PSYIV1 one clock ahead which is cleared by /CTR in the D flip-flop circuit 622. When it is assumed that the bit clock at the time of recording is FCH, and the clock having a double period obtained by frequency division is HFCH, the block period corresponds to 360 clocks for FCH and 180 clocks for HFCH at the time of normal reproduction. Accordingly, the standard counting data of PSYIV1 is 178 because of taking 0 as the base. HSWEG is the edge pulse taken out of HSW supplied from the servo block 300 as the base. The S/R latch 627 is reset with HSWEG and set with PSYEN0, and outputs PSYEN1. That is, PSYEN1 shows a flag showing whether effective counting of the block period has been made in a time section parted with HSWEG even once. In the D flip-flop circuit 623 and the D flip-flop circuit 628, the block period counting data PSYIV1 and the final data in the time section parted with HSWEG of the graph PSYEN1 showing the vality thereof are output as PSYIV and PSYVF, respectively. When effective counting of the block period has not been performed at all in the time section parted with HSWEG, PSYVF outputs a logic level L showing invalidity, and PSYIV becomes devoid of meaning. In such a manner, a highly reliable block period measurement it performed in the block period measuring unit 620, thereby making it possible to know the bit rate with high reliability and to also output flag information showing the reliability.

Next, a circuit for obtaining the signal PLLOFS for controlling the phase locked loop circuit on the basis of the block period measuring data PSYIV obtained with the block period measuring unit 620 is explained with reference to FIG. 3 again.

Element 610 is a memory which stores the data PLOTR from the system control unit 400 and sets the target bit rate in accordance with the mode data PLLMD. In the target bit rate setting unit 610 are stored two PLOTR data at the time of normal reproduction and at the time of searching, which are output after selected with PLLMD and supplied to the subtracter 651. Element 651 is a subtracter for subtracting PLOTR from PSYIV. The output of the subtracter 651 is the difference between PSYIV measured by the block period measuring unit 620 and the target value PLOTR of the block period. This difference is supplied to the PWM pattern converter 653. Element 653 is a PWM pattern converter which inputs the difference PSYIV-PLOTR and converts it into a PWM pattern. The conversion may be either table conversion or conversion by a logic gate. An example of such a conversion is shown in FIG. 17. The area is divided with the area having a deviation value close to zero as the center, and each of the divided areas is converted into a representative PWM (Pulse Width Modulation) pattern data. When PLLMD is 0, viz., at the time of normal reproduction, a fixed PWM pattern is output and the duty ratio is set at 50% which is the central value. Element 654 is a P/S conversion unit which converts the parallel data of the PWM pattern converter 653 into serial data. The serial data or the true PWM signal produced by the P/S converter 654 is output as PLLOFS through the output interface unit 696. Element 652 is a table converter which outputs a flag judging the reliability of measured data from the range of output data of the subtracter 651. In case the difference between PSYIV and PLOTR is too big, the measured data is considered to be wrong. Therefore, the logic level of VFPLFS is set to zero so as to show that the data is invalid data. Such a judgement corresponds to the case when the difference is too big in FIG. 17. Furthermore, the AND gate of 655 outputs a flag VFPLFS which shows validity of PLLOFS from the result of the table converter 652 and conditions of PSYVF. Based on the result, when the reliability of measured data is low, the output interface 696 is disabled by setting VFPLFS at L, and the output terminal PLLOFS is set at high impedance.

FIG. 18-a shows the relationship between PSYIV and PLLOFS at the time of searching in case PLOTR=120, and FIG. 18-b shows the relationship between PSYIV and PLLOFS at the time of searching in case PLOTR=178. Thus, it is possible to create a control signal based on the difference between the bit rate measurement at the time of searching and the set target bit rate.

Figure 19:
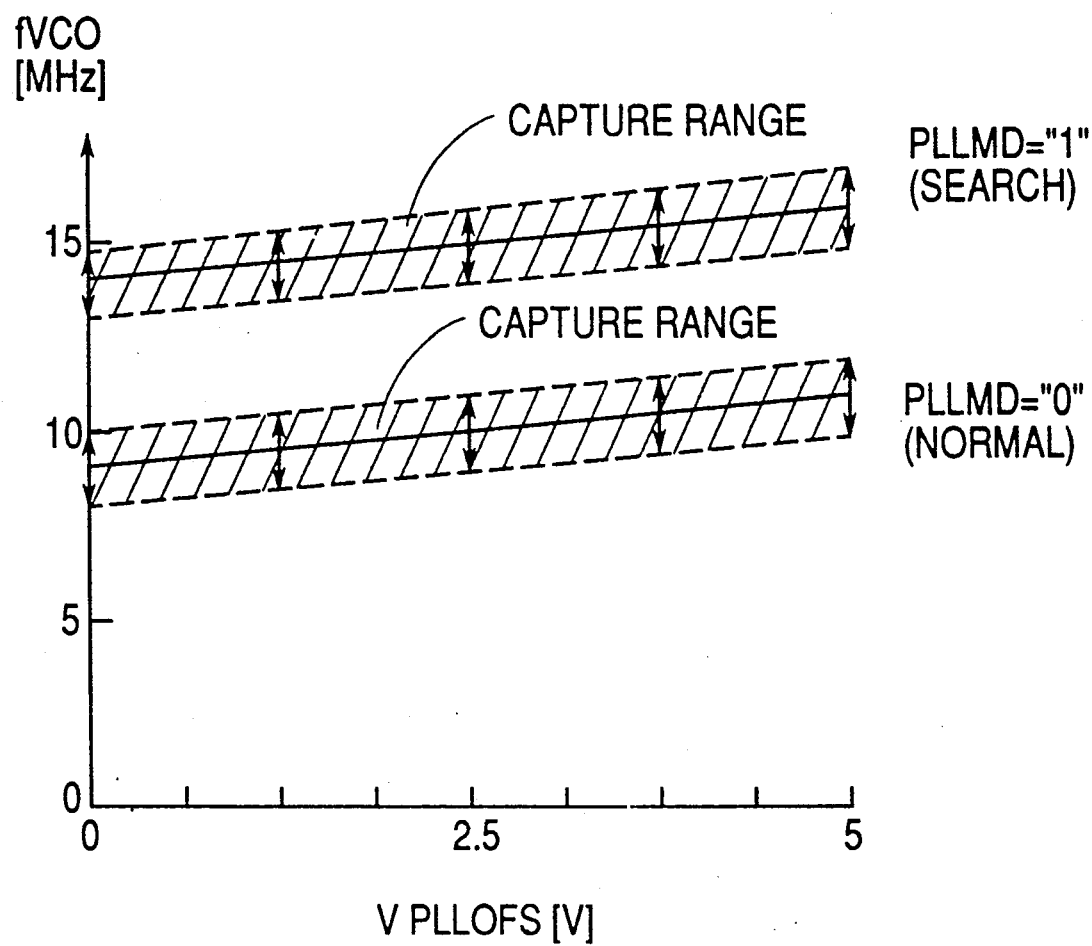
FIG. 19 is a diagram showing controlled characteristics of PLL200.

These signals are supplied to the phase locked loop circuit 200 as shown in FIG. 1. As explained already, the phase locked loop circuit 200 is provided with an input terminal of an external control signal for shifting the capture range in a wide range and an input terminal of an external control signal for shifting the capture range in a narrow range. FIG. 19 shows controlled characteristics of the phase locked loop circuit 200. In FIG. 19, the axis of abscissa represents average voltage $V_{PPLLOFS}$ of PLLOFS, and the axis of ordinate represents the frequency of the capture range of the phase locked loop circuit. The operating area of the VCO 214 is made to change greatly at the time of normal production and at the time of searching by a voltage H or a voltage L in accordance with the logic levels 1 and 0 of PLLMD which is input from the system control unit 400. Also, it is possible to change the operating area of the VCO 214 slightly with PLLOFS which is input from the modulation and demodulation unit 600.

That is, it is possible to shift the capture range in an optimum manner in accordance with the control signal based on the difference between the measured bit rate and the set target bit rate at the time of normal reproduction and at the time of searching, respectively.

FIG. 16-b shows a series of such operations typically. In FIG. 16-b, PLOTR=120. Further, it is assumed that PSYIV is changed from 120 to 110 and then to 105, viz., approximately from 14 Mbps to 15 Mbps and then to 16 Mbps as the bit rate changes. At this time, PSYIV-PLOTR becomes ±0, −10 and −15, and the duty of the PWM pattern becomes 50%, 75% and 100%, respectively. Besides, the X portion of PSYIV corresponds to, for example, a case when the reproduced signal is unobtainable because of drop-out due to a dirty head. In this case, the flag is taken down because the reliability is low and PLLOFS is made to be of Hi-Z. In such a manner, the phase locked loop circuit 200 is fed and this portion is the previous analog value held with the phase locked loop circuit 200, so as to thereby keep the whole system control undisturbed even for an abnormal input signal. The capture range of the phase locked loop circuit 200 is thus controlled, and the effective capture range of the clock reproducing phase locked loop circuit may be made wider than the capture range of the single phase locked loop circuit for the deviation quantity of the reduced bit rate in respective modes. Thus, it becomes possible to shift the capture range of the clock reproducing phase locked loop circuit always in an optimum manner in any mode and at the time of mode transition.

Figure 20:
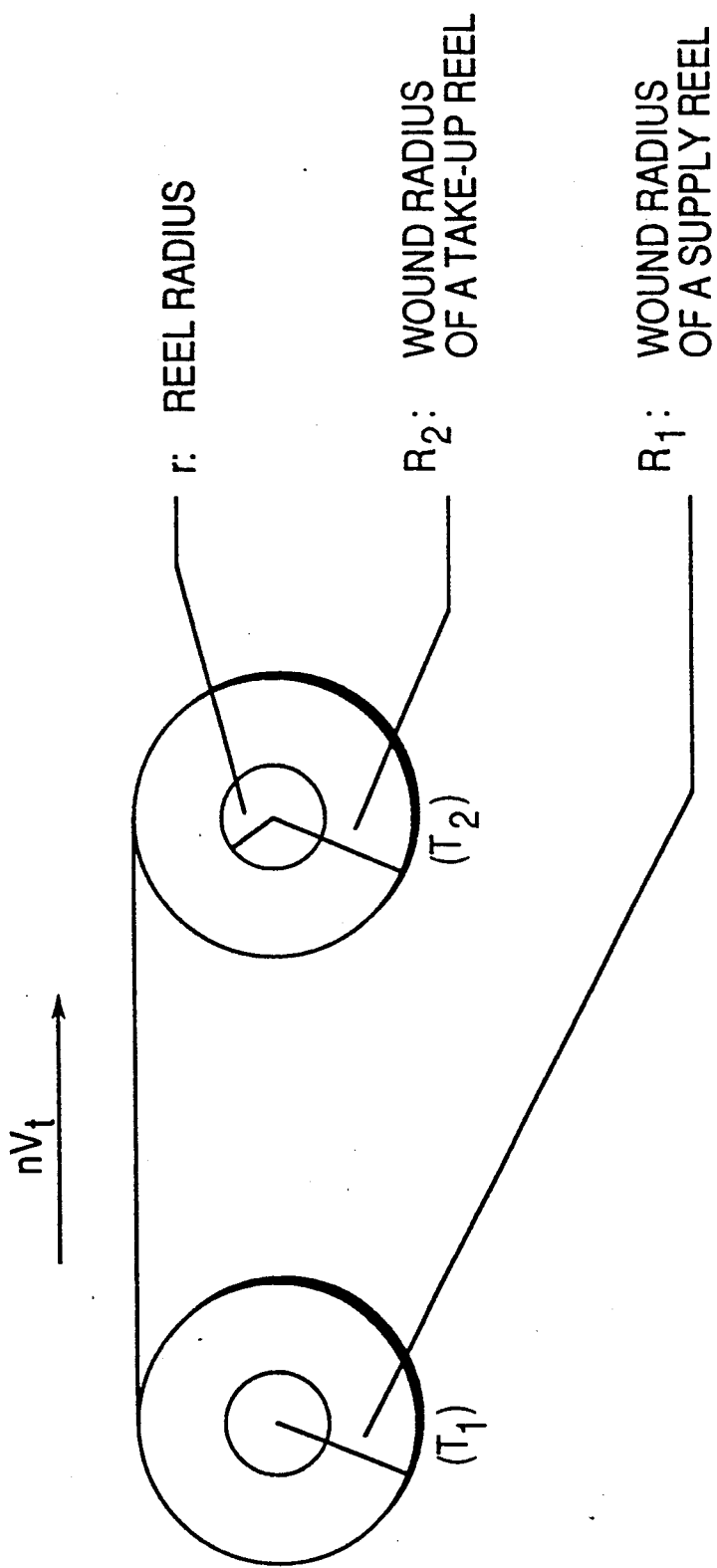
FIG. 20 is a diagram showing the wound radius of the supply reel and the take-up reel.
Figure 21:
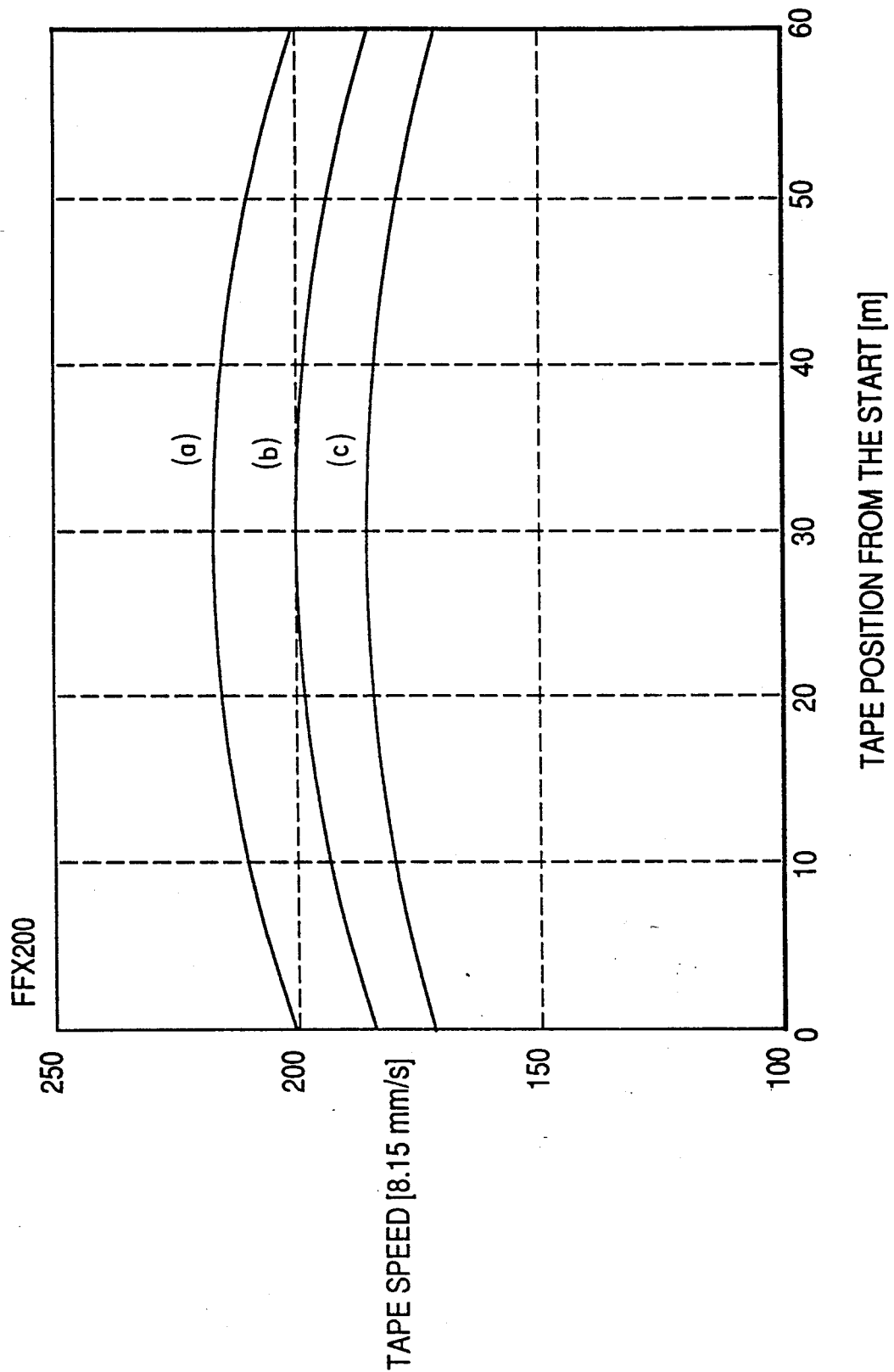
FIG. 21 is a diagram showing the relationship between the tape position and the tape speed when controlled at constant sum of the both reel rotation periods.
Figure 22:
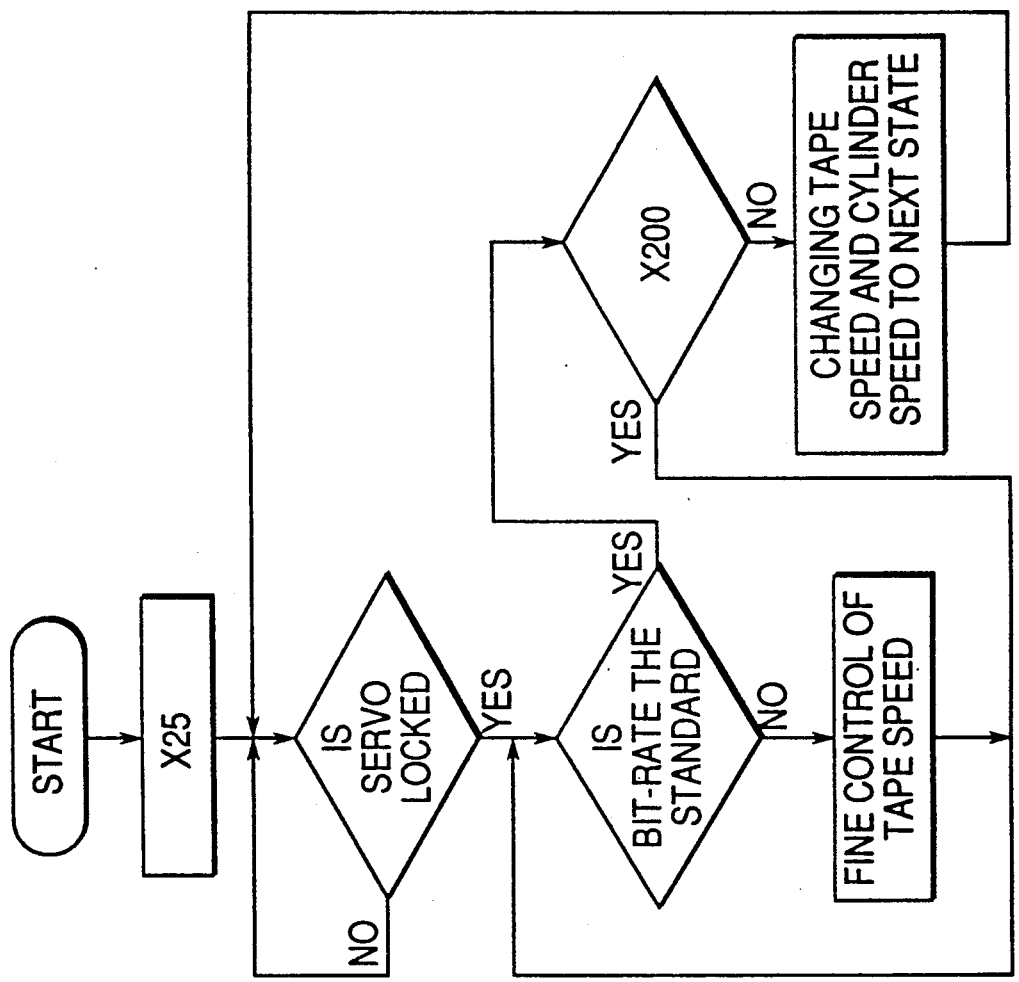
FIG. 22 is a flowchart showing procedures of tape speed control from starting of searching till correction of the bit rate.
Figure 23:
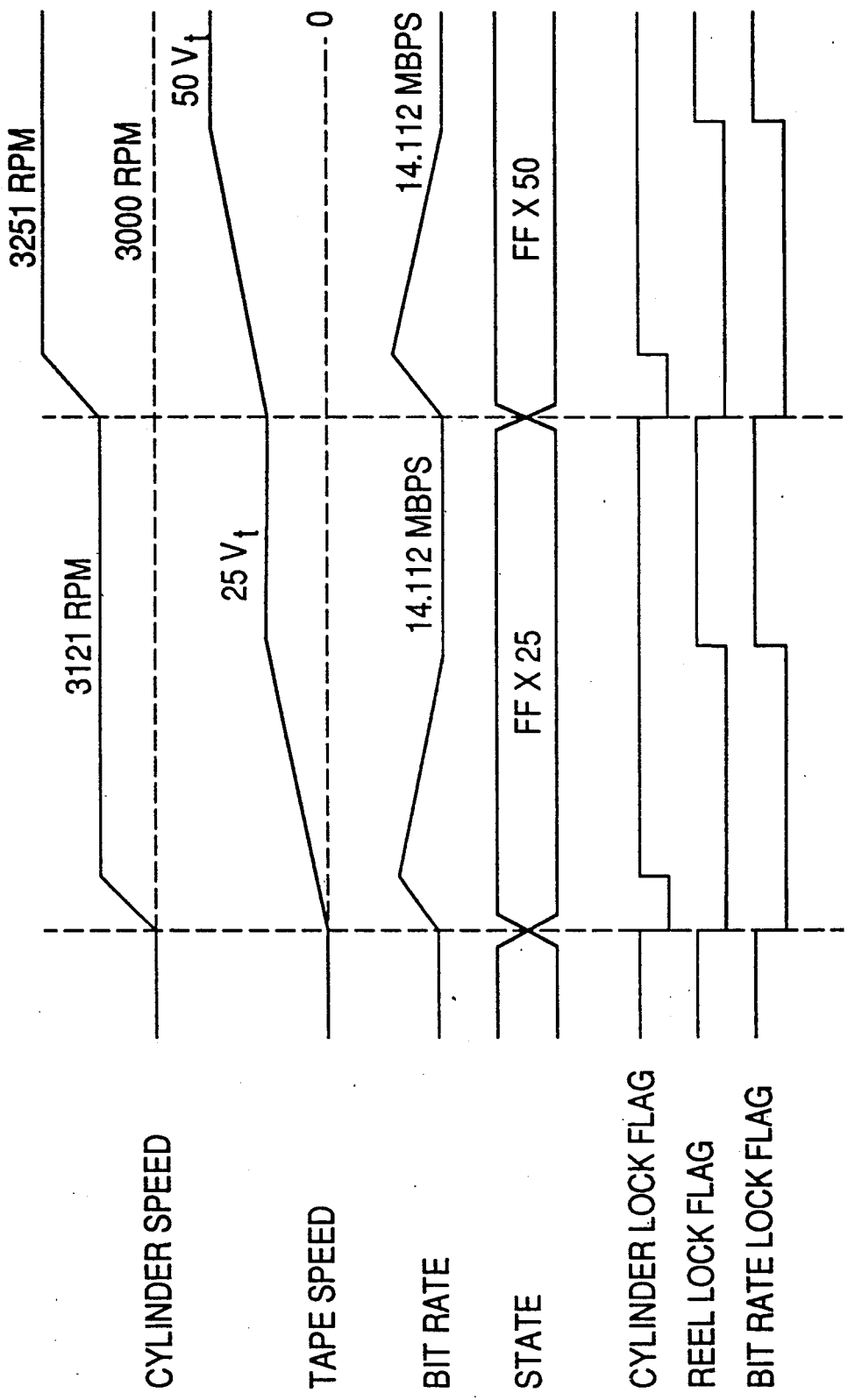
FIG. 23 is a timing diagram showing the relationship between the cylinder speed, the tape speed and the bit rate from the starting of searching until an increase of the tape speed.
Figure 24:
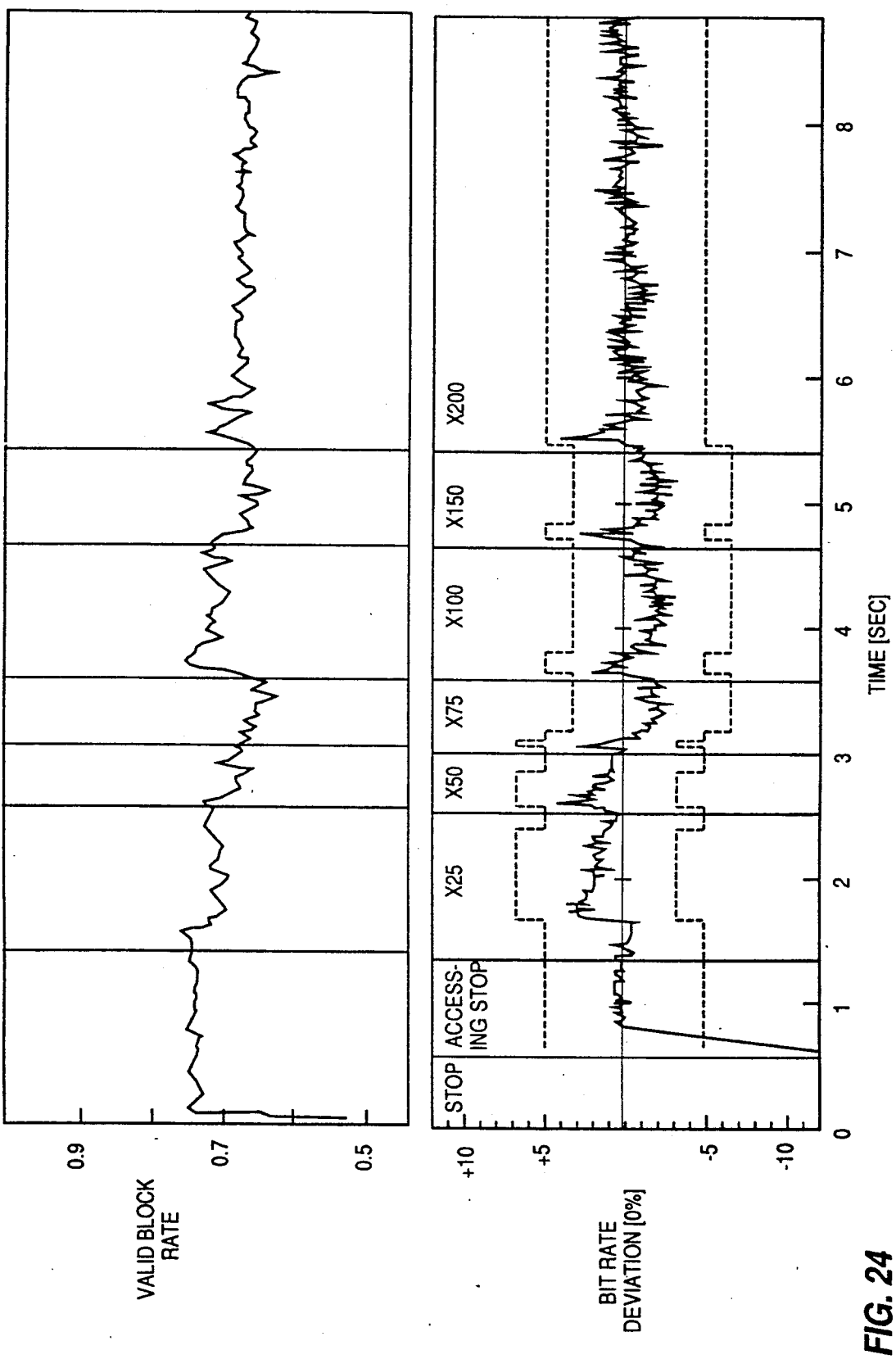
FIG. 24 is a diagram showing the data of bit rate deviation at the time of searching according to experimental results on the embodiment of the present invention.

Furthermore, it is more preferable that means for correcting the bit rate is provided, and that control signals based on the difference between respective bit rate target values corresponding to operation modes and output data of reproduced signal bit rate measuring means are supplied also to means for correcting the bit rate, so as to thereby correct the bit rate. Bit rate correction is performed by controlling the mechanism. It is comprehended from the expression (3) that it is only necessary to adjust either the cylinder speed or the tape speed. The method of correcting the bit rate by controlling the tape speed will be explained in this description. At the time of searching, it is difficult to conduct uniform tape travelling by employing a capstan as in the case of normal reproduction Since the tape is kept from the capstan and is made to travel independent of the rotation of the capstan, the tape speed is controlled with the rotating speed of the reel. As shown in FIG. 20, the winding radii of the supply reel and the take-up reel are varied. Therefore, when the tape speed or the reel speed is controlled by obtaining the sum of respective reel rotation periods so that this sum of periods are constant, almost constant tape speed may be achieved. FIG. 21 shows the relationship between the tape position and the tape speed. (b) in the Figure shows the characteristics when the sum of periods is controlled at constant by setting coefficients so that the tape speed becomes 200×Vt at the tape position at the center, and (c) and (a) show characteristics when offset is applied to coefficients. Fine adjustment of the tape speed, viz., correction of the bit rate is performed by adding offset to coefficients of control of the sum of periods. In FIG. 1, block period data PSYIV and PSYVF are supplied from the modulation and demodulation unit 600 to the tape speed control unit 301 so as to add offset to coefficients of sum of periods control of the reel servo control unit 304. With such a construction, the auxiliary operation is performed, for example, as follows. If deviation is made in the direction higher than the target bit rate in rapid traverse searching at the tape speed of 200×Vt, a value of PSYIV smaller than the target value is measured. Therefore, a reel driver 305 is controlled in the tape speed control unit 301 so as to increase the tape speed further. As it is apparent from FIG. 13, as the tape speed is increased, the bit rate is lowered. So, operation is performed so as to get closer to the target value. A series of operations are performed repeatedly by feedback until the bit rate coincides with the target value. The start of searching operation is performed in such a manner that the tape speed is increased gradually stepwise as shown in FIG. 22. This is done for the purpose of decreasing the transient variation of the bit rate when the tape speed and the cylinder speed are switched at the same time. FIG. 23 shows the transient speed at this time. The cylinder speed is increased to 3,000 rpm in advance so that searching operation is performed at 1.5 times of the bit rate or 14.112 Mbps from the time of normal production. Thereafter, the tape speed is increased in order to start from 25 Vt to 50 Vt and then to 200 Vt. As the result of bit rate correction by means of fine adjustment of the tape speed, it becomes possible to control the bit rate at a certain deviation even at the transient time of the tape speed variation or at the time of 200 times high speed searching. FIG. 24 shows the data of experimental results according to an embodiment of the present invention. The bit rate deviation being controlled within the range of +4% to −3%, the shift of the capture range of the clock reproducing phase locked loop circuit is +2% to −2% at most. Accordingly, it is possible to make the speed increase steps of the tape speed coarse and fast or to increase the maximum tape speed easily by utilizing the shift of the capture range of the clock reproducing phase locked loop circuit effectively.

Figure 2:
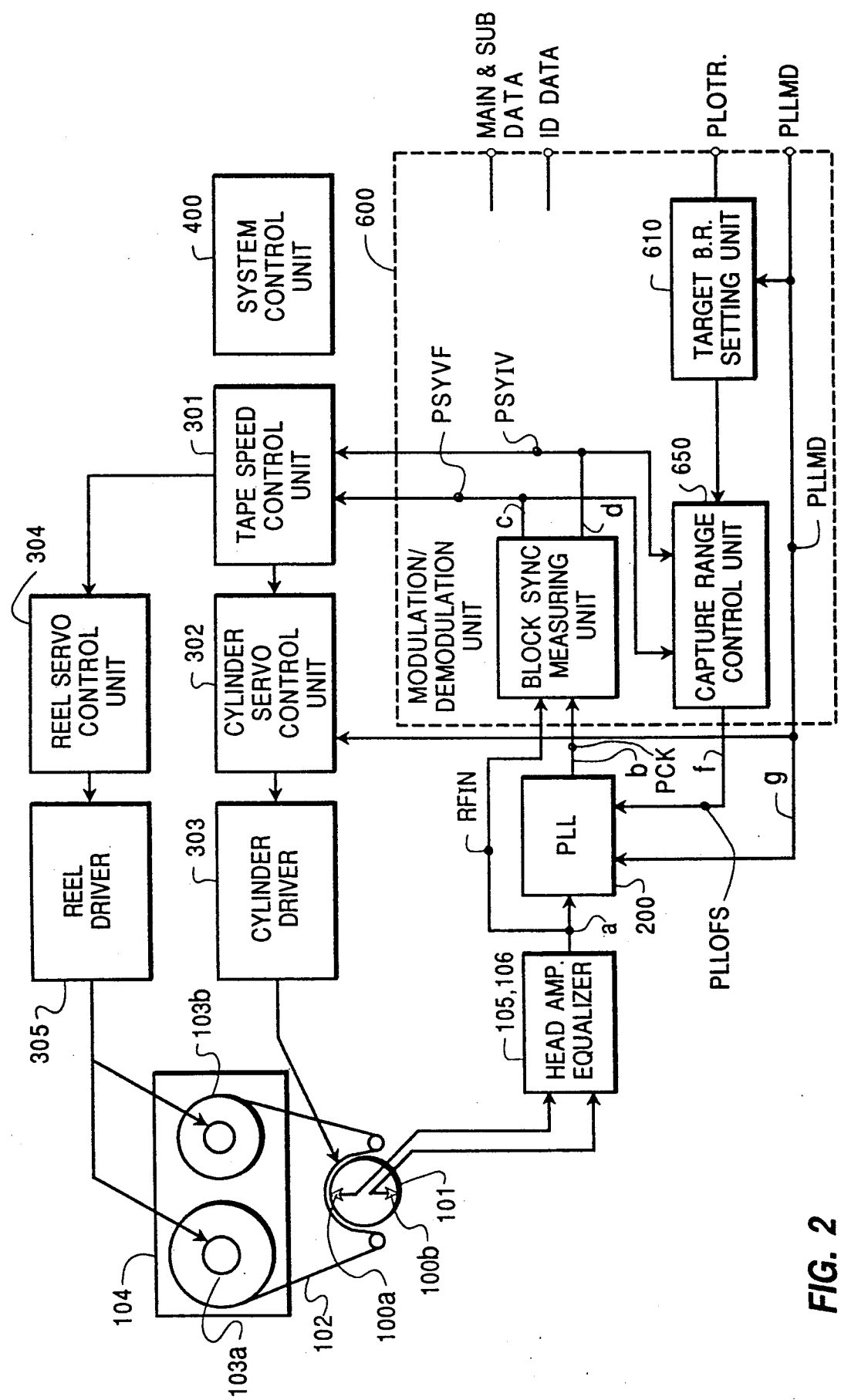
FIG. 2 is a block diagram showing a principal part of a second embodiment of a data reproducing apparatus according to the present invention.

It is more preferable to construct in such a manner that control signals based on the difference between respective bit rate target values and output data of bit rate measuring means of reproduced signals are supplied to the cylinder servo control unit so as to correct the bit rate. FIG. 2 shows a second embodiment thus constructed. In FIG. 2, what is different from FIG. 1 is that PLLOFS which is output from the capture range control unit 650 is supplied to the cylinder servo control unit 302. The control of the tape speed is performed in a similar manner so that the sum of the both reel rotation periods is made constant. As shown in FIG. 2, PLLOFS which is output from the capture range control unit 650 is supplied to the cylinder servo control unit 302 and the cylinder speed is adjusted finely, so as to thereby correct the bit rate. The correcting operation with such a construction is as follows. In case of deviation in the direction higher than the target bit rate in rapid traverse searching at the tape speed of 200×Vt, PSYIV smaller than the target value is measured, and the duty of PLLOFS which is output from the capture range control unit 650 becomes higher than 50%. This PLLOFS is supplied to the phase locked loop circuit 200 so as to enlarge the effective capture range, and supplied to the cylinder servo control unit 302 so as to thereby control the cylinder driver 303 so as to reduce the cylinder speed. As it is apparent from FIG. 13, when the cylinder speed is reduced, the bit rate is lowered, thus operating to get closer to the target value. A series of operations are performed repeatedly with feedback until the bit rate coincides with the target value. The starting operation of searching may be performed in the similar manner as shown in FIG. 22. The reason for such an arrangement is that the control response of the cylinder servo is generally quicker than the control response of the tape speed. Even if there is control delay of the tape speed, the bit rate which is the final object is made to get closer to the target by controlling the cylinder speed of quick response. Therefore, the aberration of linking control between the tape speed and the cylinder speed at the transient time is small. Accordingly, it is possible to further control the deviation of the bit rate, to make the speed-up steps of the tape speed more coarse and faster by utilizing effectively the shift of the capture range of the clock reproducing phase locked loop circuit, and to increase further the maximum tape speed easily.

As described above, the data reproducing apparatus according to the present invention has the first effect that the effective capture range of the clock reproducing phase locked loop circuit is made wider than the capture range of the single phase locked loop circuit for the deviation quantity of the reproducing bit rate in respective modes of normal reproduction and searching, and the second effect that the variation itself of the reproducing bit rate may be made smaller by giving control information based on the difference from the reproducing bit rate to the mechanism control unit. These two effects operate in relation to each other. In other words, by the interaction that the feedback control loop forming method of the system including the mechanism and the method of enlarging the dynamic range of the control signal extracting unit which is a component of the control signal, viz., the deviation quantity measuring unit of the reproducing bit rate make up for each other, it is possible to measure the bit rate deviation quantity while maintaining locked state of the clock reproducing phase locked loop circuit and to correct so that the bit rate deviation is made minimal. Accordingly, such an excellent effect is produced that the control system may be stabilized while reproducing data correctly even when the mechanism load variation is large or under the transient state of mode transition.

Moreover, according to the present invention, it is possible to measure the period of a group of blocks of reproduced data with the standard clock and obtain the absolute value of the aberration from the target value in order to obtain the control signal. Also, reproduced data being used for taking out the period, it is guaranteed that measured data obtained are those that are within the data existence period of time evidently.

Moreover, error detecting being performed, it is possible to ascertain the reliability of measured data, and to adopt only the measured data in case of high reliability ability and to hold and use the data obtained previously in case of low reliability. Also, when the state of low reliability continues for a long time, it is possible to perform protection by using preset default value.

Since it is possible to perform highly reliable and stable control of the data at the time of high speed searching even when the mechanism load variation is big or under the transient state of mode transition by knowing the bit rate of the reproduced signal and obtaining an exact control signal. Thus, the data reproducing apparatus which reads data always stably may be realized.

The present invention may be applied not only to an R-DAT, but also to appliances such as a digital video recorder and a compact disc unit and all kinds of apparatus that reproduce digital data such as streaming devices for data storage.

What is claimed is:

1. A data reproducing apparatus comprising:
read means for reading a recording medium to obtain a reproduced signal;
bit rate measuring means for measuring a bit rate of the reproduced signal;
a clock reproducing phase locked loop circuit for extracting a clock from the reproduced signal;
capture range control means for controlling a capture range of the phase locked loop circuit;
bit rate target value setting means for setting a plurality of bit rate target values;
system control means for switching an operating frequency range of the clock reproducing phase locked loop circuit corresponding to respective bit rate target values; and
capture range control signal creating means for supplying a signal corresponding to a difference data between the bit rate target values and the output data of the bit rate measuring means to the clock reproducing phase locked loop circuit,
said clock reproducing phase locked loop circuit including:
mode switching means for switching the operating frequency range of the clock reproducing phase locked loop circuit by inputting a control signal from the system control means; and
capture range control means for varying parameters of a voltage controlled frequency oscillator by inputting a signal from the capture range control signal creating means;
wherein the bit rate measuring means includes judging means which judge the reliability of the measured data and outputs a judgment signal to the capture range control signal creating means, and
wherein said capture range control signal creating means creates a control signal based on the difference between the bit rate target values and the output data of the bit rate measuring means, and supplies the control signal to the clock reproducing phase locked loop circuit when the judgment signal shows that the reliability falls within a predetermined range, and
creates a control signal based on the difference from the bit rate target value using latest output data in that the reliability falls within a predetermined range among output data of the bit rate measuring means obtained previously in place of output data of the present bit rate measuring means and supplies the control signal to the clock reproducing phase locked loop circuit when the judgement signal shows that the reliability falls outside of the predetermined range.

2. A data reproducing apparatus according to claim 1, wherein:
when the measurement signal shows that the reliability falls outside of a predetermined range, the capture range control signal creating means creates a control signal based on the difference from the bit rate target value using latest output data in that the reliability falls within a predetermined range among output data of the bit rate measuring means obtained previously in place of output data of the present bit rate measuring means and supplies the control signal to the clock reproducing phase locked loop circuit; and
when the state that the reliability falls outside of a predetermined range is continued further, creates the control signal so that the judgement signal is made to change to a preset default control signal instantly or gradually, and supplies it to the clock reproducing phase locked loop circuit.

3. A data reproducing apparatus comprising:
read means for reading a recording medium to obtain a reproduced signal;
bit rate measuring means for measuring a bit rate of the reproduced signal;
a clock reproducing phase locked loop circuit for extracting a clock from the reproduced signal;
capture range control means for controlling a capture range of the phase locked loop circuit;
bit rate target value setting means for setting a plurality of bit rate target values;
system control means for switching an operating frequency range of the clock reproducing phase locked loop circuit corresponding to respective bit rate target values; and
capture range control signal creating means for supplying a signal corresponding to a difference data between the bit rate target values and output data of the bit rate measuring means to the clock reproducing phase locked loop circuit, said clock reproducing phase locked loop circuit including:

mode switching means for switching the operating frequency range of the clock reproducing phase locked loop circuit by inputting a control signal from the system control means; and capture range control means for varying parameters of a voltage controlled frequency oscillator by inputting a signal from the capture range control signal creating means;

wherein the bit rate measuring means comprises:

error detection means for detecting an error by an error detecting code contained in the data;

continuity detection means for detecting that regular pattern or word that appear in each of a series of data length is detected continuously; and judgement means for judging the reliability based on the output of the continuity detection means and the result of detection of an error in regular pattern or word.

4. A data reproducing apparatus comprising:

read means for reading a recording medium to obtain a reproduced signal;

bit rate measuring means for measuring a bit rate of the reproduced signal;

a clock reproducing phase locked loop circuit for extracting a clock from the reproduced signal;

capture range control means for controlling a capture range of the phase locked loop circuit;

bit rate target value setting means for setting a plurality of bit rate target values;

system control means for switching an operating frequency range of the clock reproducing phase locked loop circuit corresponding to respective bit rate target values;

capture range control signal creating means for supplying a signal obtained by conversion of a difference data between the bit rate target values and output data of the bit rate measuring means to the clock reproducing phase locked loop circuit; and bit rate correcting means for correcting a bit rate of the reproduced signal, said clock reproducing phase locked loop circuit including:

mode switching means for switching the operating frequency range of the clock reproducing phase locked loop circuit by inputting a control signal from the system control means; and capture range control means for varying parameters of a voltage controlled frequency oscillator by inputting a signal from capture range control signal creating means;

wherein the bit rate measuring means includes judging means which judge the reliability of the measured data and outputs a judgement signal to the capture range control signal creating means, and wherein said capture range control signal creating means creates a control signal based on the difference between the bit rate target values and the output data of the bit rate measuring means, and supplies the control signal to the clock reproducing phase locked loop circuit when the judgment signal shows that the reliability falls within a predetermined range, and creates a control signal based on the difference from the bit rate target value using latest output data in that the reliability falls within a predetermined range among output data of the bit rate measuring means obtained previously in place of output data of the present bit rate measuring means and supplies the control signal to the clock reproducing phase locked loop circuit when the judgement signal shows that the reliability falls outside of the predetermined range.

5. A data reproducing apparatus according to claim 4, wherein:

when the measurement signal shows that the reliability falls outside of a predetermined range, the capture range control signal creating means creates a control signal based on the difference from the bit rate target value using latest output data in that the reliability falls within a predetermined range among output data of the bit rate measuring means obtained previously in place of output data of the present bit rate measuring means and supplies the control signal to the clock reproducing phase locked loop circuit; and when the state that the reliability falls outside of a predetermined range is continued further, creates the control signal so that the judgement signal is made to change to a preset default control signal instantly or gradually, and supplies it to the clock reproducing phase locked loop circuit.

6. A data reproducing apparatus according to claim 4, wherein the recording medium is a tape, and the read means comprises:

a supply reel wound with a tape and a reel driver for driving a take-up reel so as to have the tape travel;

reel servo control means for controlling the reel driver so as to obtain a predetermined tape speed;

a head which is contacted with the tape opposedly for reading a signal;

a cylinder on which the head is mounted;

a cylinder driver for driving the cylinder for rotation; and mechanism means for pulling out the tape from the reel and having the tape travel under such a state that it is wound round the cylinder.

7. A data reproducing apparatus according to claim 6, wherein the bit rate correcting means includes tape speed control means for supplying a signal for adjusting the tape speed to the reel servo control means by inputting a signal obtained by conversion on the basis of the output data of the bit rate measuring means or the difference data between the bit rate target values and the output data of the bit rate measuring means.

8. A data reproducing apparatus according to claim 6, wherein the bit rate correcting means includes cylinder speed control means for supplying a signal for adjusting the cylinder speed to the cylinder servo control means by inputting a signal obtained by conversion on the basis of the output data of the bit rate measuring means or the difference data between the bit rate target values and the output data of the bit rate measuring means.

9. A data reproducing apparatus comprising:

read means for reading a recording medium to obtain a reproduced signal;

bit rate measuring means for measuring a bit rate of the reproduced signal;

a clock reproducing phase locked loop circuit for extracting a clock from the reproduced signal;

capture range control means for controlling a capture range of the phase locked loop circuit; and capture range control signal creating means for supplying a signal obtained by conversion on the basis of a difference data between bit rate target values and output data of the bit rate measuring means to the clock reproducing phase locked loop circuit, the clock reproducing phase locked loop circuit including capture range control means for inputting a signal from the capture range control signal creating means and varying parameters of a voltage controlled frequency oscillator, the bit rate measuring means comprising:
means for detecting regular pattern or word appearing in each of a series of data length;
means for counting timing of this detected period on a known time base;
means for outputting measured data obtained by the counting timing; and
judgement means for judging the reliability of these measured data and outputting a judgement signal to the capture range control signal creating means, and the capture range control signal creating means creates a control signal based on the difference between the bit rate target values and the output data of the bit rate measuring means, and supplies the control signal to the clock reproducing phase locked loop circuit when the judgement signal shows that the reliability falls within a predetermined range, creates a control signal based on the difference from the bit rate target value using latest output data in that the reliability falls within a predetermined range among output data of the bit rate measuring means obtained previously in place of output data of the present bit rate measuring means and supplies the control signal to the clock reproducing phase locked loop circuit when the judgement signal shows that the reliability falls outside of the predetermined range, and when the state that the reliability falls outside of a predetermined range is continued further, creates the control signal so that the judgement signal is made the to change to a preset default control signal instantly or gradually, and supplies it to the clock reproducing phase locked loop circuit.

10. A data reproducing apparatus according to claim 9, wherein:
the judgement means comprises:
error detecting means for detecting an error by utilizing an error detection code contained in the data; and
continuity detecting means for detecting that regular pattern or word appearing in each of a series of data length is detected continuously; and
the reliability is judged based on the output of the continuity detecting means and the result of error detection on regular pattern or word.

11. A data reproducing apparatus comprising:
read means for reading a recording medium to obtain a reproduced signal;
bit rate measuring means for measuring a bit rate of the reproduced signal;
a clock reproducing phase locked loop circuit for extracting a clock from the reproduced signal;
capture range control means for controlling a capture range of the phase locked loop circuit;
bit rate target value setting means for setting a plurality of bit rate target values;
system control means for switching an operating frequency range of the clock reproducing phase locked loop circuit corresponding to respective bit rate target values;
capture range control signal creating means for supplying a signal obtained by conversion of a difference data between the bit rate target values and output data of the bit rate measuring means to the clock reproducing phase locked loop circuit; and
bit rate correcting means for correcting a bit rate of the reproduced signal,
said clock reproducing phase locked loop circuit including:
mode switching means for switching the operating frequency range of the clock reproducing phase locked loop circuit by inputting a control signal from the system control means; and
capture range control means for varying parameters of a voltage controlled frequency oscillator by inputting a signal from capture range control signal creating means;
wherein the bit rate measuring means comprises:
error detection means for detecting an error by an error detecting code contained in the data;
continuity detection means for detecting that regular pattern or word that appear in each of a series of data length is detected continuously; and
judgement means for judging the reliability based on the output of the continuity detection means and the result of detection of an error in regular pattern or word.

12. A data reproducing apparatus according to claim 11, wherein the recording medium is a tape, and
the read means comprises:
a supply reel wound with a tape and a reel driver for driving a tape-up reel so as to have the tape travel;
reel servo control means for controlling the reel driver so as to obtain a predetermined tape speed;
a head which is contacted with the tape opposedly for reading a signal;
a cylinder on which the head is mounted;
a cylinder driver for driving the cylinder for rotation; and
mechanism means for pulling out the tape from the reel and having the tape travel under such a state that it is wound round the cylinder.

13. A data reproducing apparatus according to claim 12, wherein the bit rate correcting means includes tape speed control means for supplying a signal for adjusting the tape speed to the reel servo control means by inputting a signal obtained by conversion on the basis of the output data of the bit rate measuring means or the difference data between the bit rate target values and the output data of the bit rate measuring means.

14. A data reproducing apparatus according to claim 12, wherein the bit rate correcting means includes cylinder speed control means for supplying a signal for adjusting the cylinder speed to the cylinder servo control means by inputting a signal obtained by conversion on the basis of the output data of the bit rate measuring means or the difference data between the bit rate target values and the output data of the bit rate measuring means.

* * * * *